United States Patent [19]
Yukawa et al.

[11] Patent Number: 6,003,370
[45] Date of Patent: Dec. 21, 1999

[54] ELASTIC SURFACE WAVE GYROSCOPE

[75] Inventors: Kazuhiko Yukawa, Sakai; Yoshimitsu Fukuda, Takarazuka; Toshiro Higuchi; Minoru Kurosawa, both of Yokohama, all of Japan

[73] Assignee: Minolta Co., Ltd., Osaka, Japan

[21] Appl. No.: 08/864,504

[22] Filed: May 29, 1997

[30] Foreign Application Priority Data

May 30, 1996 [JP] Japan ................................. 8-137021
May 30, 1996 [JP] Japan ................................. 8-137022
May 30, 1996 [JP] Japan ................................. 8-137023

[51] Int. Cl.$^6$ ........................................................ G01P 3/00
[52] U.S. Cl. ........................................................ 73/504.01
[58] Field of Search ........................... 73/504.01, 514.28; 310/313 B, 313 R, 313 D; 333/195, 193, 194, 151, 154, 196

[56] References Cited

U.S. PATENT DOCUMENTS 4,467,235 8/1984 De Wames et al. ................ 310/313 D

FOREIGN PATENT DOCUMENTS 6-281465 10/1994 Japan .

*Primary Examiner*—Hezron Williams
*Assistant Examiner*—Richard A. Moller
*Attorney, Agent, or Firm*—Sidley & Austin

[57] ABSTRACT

An elastic surface wave gyroscope includes two transducers attached on a piezoelectric substrate to generate elastic surface waves having different frequencies on the piezoelectric substrate, and two pair of reflectors for reflecting the different elastic surface waves toward the generators to produce two different standing waves, and another pair of reflectors for reflecting an elastic surface wave caused by a Coriolis force to produce a third standing wave, and a detector for detecting an electric signal corresponding to the third standing wave. This gyroscope has a high detection sensitivity.

20 Claims, 18 Drawing Sheets

ELASTIC SURFACE WAVE GYROSCOPE

BACKGROUND OF THE INVENTION

This invention relates to an elastic surface wave gyroscope for detecting a Coriolis force generated on the surface of a piezoelectric substrate by the interaction of a surface oscillation caused by an elastic surface wave of the piezoelectric substrate and a rotary motion of the piezoelectric substrate by converting it into a voltage.

A known gyroscope which uses elastic surface waves is disclosed in, for example, Japanese Unexamined Patent publication No. 6-281465.

Specifically, this publication discloses an elastic surface wave gyroscope constructed such that a pair of inter-digital transducer for generating elastic surface waves of the same frequency (hereinafter, "driving IDTs") with an inter-digital transducer for detecting a Coriolis force (hereinafter, "detecting IDT") arranged therebetween, and a pair of reflectors provided on the outsides of the driving IDTs for reflecting elastic surface waves toward the detecting IDT are so formed on one surface of a piezoelectric substrate to have a specified positional relationship to each other.

FIG. 21 is a diagram showing the detecting IDT, the pair of driving IDTs and the pair of reflectors formed on the surface of the piezoelectric substrate of the elastic surface wave gyroscope.

Distances d1, d2 between teeth of comb-shaped electrodes D1, D2 of the detecting IDT 101 and the driving IDTs 102 formed on the surface of the piezoelectric substrate 100 are equal (½ of a wavelength λ of the elastic surface wave). The reflectors 104, 105 are constructed by grating radiators in which 100 line electrodes D3 are arranged at specified intervals (approximately λ/2).

In the piezoelectric substrate 100, standing waves of elastic surface waves are generated by causing the respective driving IDTs 102, 103 to generate elastic surface waves propagating in outward directions therefrom and by reflecting these elastic surface waves toward the detecting IDT 101 by the reflectors 104, 105. The detecting IDT 101 is formed such that the teeth of the respective comb-shaped electrodes D1, D2 are located in predetermined positions corresponding to the nodes of the elastic surface wave (standing wave).

In the above elastic surface wave gyroscope, when the piezoelectric 100 undergoes a rotary motion with the standing wave of the elastic surface wave generated on the surface thereof, an elastic surface wave (standing wave) is generated caused by a Coriolis force and phase-shifted by 90° from this elastic surface wave along the vertical direction with respect to a direction of oscillation cause by this elastic surface wave. Accordingly, the detecting IDT 101 detects a voltage corresponding to the oscillation of the elastic surface wave converted by the piezoelectric effect.

The above elastic surface wave gyroscope generates the standing elastic surface waves between the driving IDTs 102, 103 by reflecting the elastic surface waves of the same frequency generated by the driving IDT 102, 103 toward the detecting IDT 101 by the reflectors 104, 105. Since the Coriolis force generated by the interaction of the elastic surface wave and the rotary motion of the piezoelectric substrate 100 is phase-shifted by 90° from the elastic surface wave, it is difficult to dispose the reflectors 104, 105 in positions where they have a sufficient reflection characteristic for both the elastic surface waves generated by the driving IDTs 102, 103 and the elastic surface wave caused by the Coriolis force.

If the reflectors 104, 105 are disposed in positions where they satisfactorily reflect the elastic surface waves generated by the driving IDTs 102, 103, the elastic surface waves caused by the Coriolis force are not sufficiently reflected toward the detecting IDT 101 by the reflectors 104, 105. In some cases, the elastic surface wave may be absorbed or reflected in such a manner as to attenuate an incident wave. Thus, it is difficult to detect a voltage corresponding to a sufficient Coriolis force (standing wave) by the detecting IDT 101.

Further, the elastic surface wave gyroscope detects only the Coriolis force by separating it from the elastic surface wave by disposing the teeth of the comb-shaped electrodes D1, D2 of the detecting IDT 101 in the predetermined positions corresponding to the nodes of the standing wave. Accordingly, detection accuracy depends on the accuracy of the mutual positional relationship of the detecting IDT 101, the driving IDTs 102, 103 and the reflectors 104, 105, making it difficult to manufacture a high accuracy or precision elastic surface wave gyroscope.

More specifically, unless the spatial phase difference between the driving IDTs 102, 103 and the detecting IDT 101 is precisely 90°, the signal detected by the detecting IDT 101 contains signal components corresponding to the elastic surface waves generated by the driving IDTs 102, 103, causing a detection error.

On the other hand, the position accuracy of the detecting IDT 101, the driving IDTs 102, 103 and the reflectors 104, 105 depends on an electrode fabrication technique on the surface of the piezoelectric substrate. Accordingly, there is a limit to accuracy improvements.

Further, since the elastic surface wave gyroscope is constructed such that the standing waves of the elastic surface waves are generated on the surface of the piezoelectric substrate, and the magnitude of the Coriolis force (standing wave) generated by the interaction of the surface oscillation caused by this standing wave and the rotary motion of the piezoelectric substrate is detected, the magnitude of the standing wave of the elastic surface wave needs to be stabilized in order to stabilize a detection sensitivity with respect to a temperature change.

For example, if the temperature characteristic of an oscillating frequency of a high frequency oscillator for generating high frequency waves to be applied to the driving IDTs 102, 103 and that of a reflection frequency of the reflectors 104, 105 differ, the frequency of the elastic surface waves generated on the piezoelectric substrate 100 and the reflection frequency of the reflectors 104, 105 differ, with the result that the reflection characteristic of the reflectors 104, 105 for the elastic surface waves is reduced. In other words, the phase relationship between progressive waves of the elastic surface waves propagating to the reflectors 104, 105 shifts from a predetermined phase relationship which enables the generation of the standing wave, with the result that the reflectors 104, 105 cannot act to generate a suitable standing wave from the elastic surface waves.

This causes a reduction in the amplitude characteristic of the standing waves of the elastic surface waves and also a reduction in the detection sensitivity of the Coriolis force. The above publication discloses only the construction of the detecting IDT 101, the driving IDTs 102, 103 and the reflectors 104, 105 formed on the surface of the piezoelectric substrate, but does not disclose a method for stabilizing the temperature characteristic of the elastic surface waves to prevent a reduction in the detection sensitivity.

SUMMARY OF THE INVENTION

It is an object of the present invention to provide an elastic surface wave gyroscope which has overcome the problems residing in the prior art.

It is another object of the present invention to provide an elastic surface wave gyroscope which can generate a high level of standing wave of an elastic surface wave caused by a Coriolis force and have a high detection sensitivity.

It is another object of the present invention to provide an elastic surface wave gyroscope which can reduce the required position accuracy of a detecting IDT and other devices without reducing a detection accuracy.

It is still another object of the present invention to provide an elastic surface wave gyroscope which can stabilize the temperature characteristic of the amplitude of an elastic surface wave to obtain a stable Coriolis force detection sensitivity.

According to an aspect of the present invention, a gyroscope comprises: a piezoelectric substrate; a first generator which generates a first elastic surface wave on the piezoelectric substrate; a second generator which generates a second elastic surface wave on the piezoelectric substrate, the second elastic surface wave having a different frequency from the first elastic surface wave; a first reflector which reflects the first elastic surface wave toward the first generator to produce a first standing wave; a second reflector which reflects the second elastic surface wave toward the second generator to produce a second standing wave; a third reflector which reflects a third elastic surface wave toward the first and second generators to produce a third standing wave, the third elastic surface wave being an interference wave of the first and second standing waves, the third standing wave being adapted for detecting a Coriolis force; and a detector which detects an electric signal which is caused in the piezoelectric substrate by the third standing wave.

According to another aspect of the present invention, a gyroscope comprises: a piezoelectric substrate; a pair of generators which generate an elastic surface wave on the piezoelectric substrate; a pair of reflectors which are arranged outside of the generators to reflect the elastic surface wave toward the generators to produce a standing wave; a detector which is arranged between the pair of generators to detect an electric signal which is caused in the piezoelectric substrate by a wave occurring due to a Coriolis force acting on the standing wave; and a corrector which corrects an detection of the detector to produce an electric signal having no influence of the standing wave.

According to still another aspect of the present invention, a gyroscope comprises: a piezoelectric substrate; a pair of generators which generate an elastic surface wave on the piezoelectric substrate; an oscillator which generates a high frequency wave to drive the pair of generators, the oscillator having an elastic surface wave resonator made of the same material as the piezoelectric substrate; a pair of reflectors which are arranged outside of the generators to reflect the elastic surface wave toward the generators to produce a standing wave; and a detector which is arranged between the pair of generators to detect an electric signal which is caused in the piezoelectric substrate by a wave occurring due to a Coriolis force acting on the standing wave.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
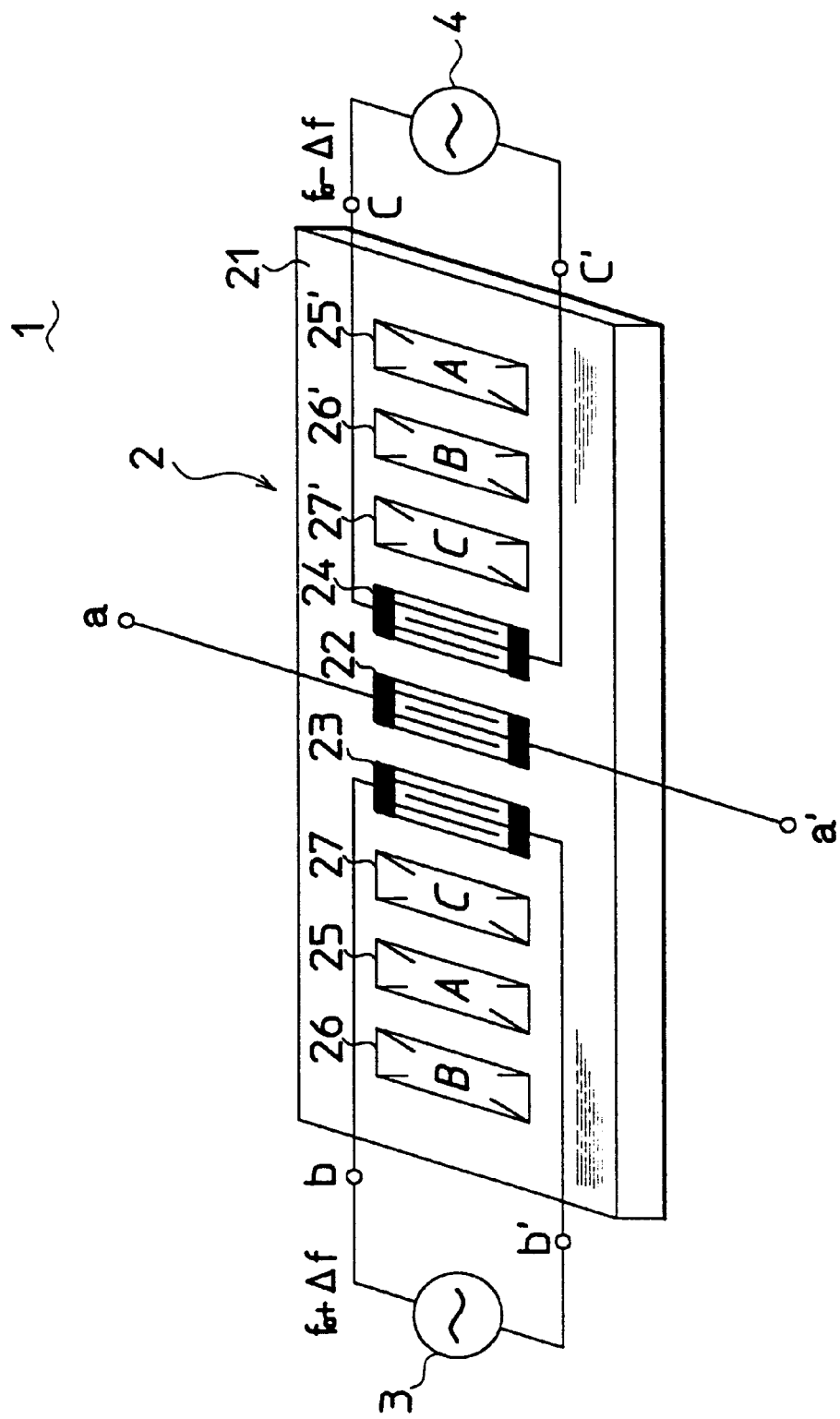
FIG. 1 is a construction diagram of a first elastic surface wave gyroscope according to the invention.
Figure 2:
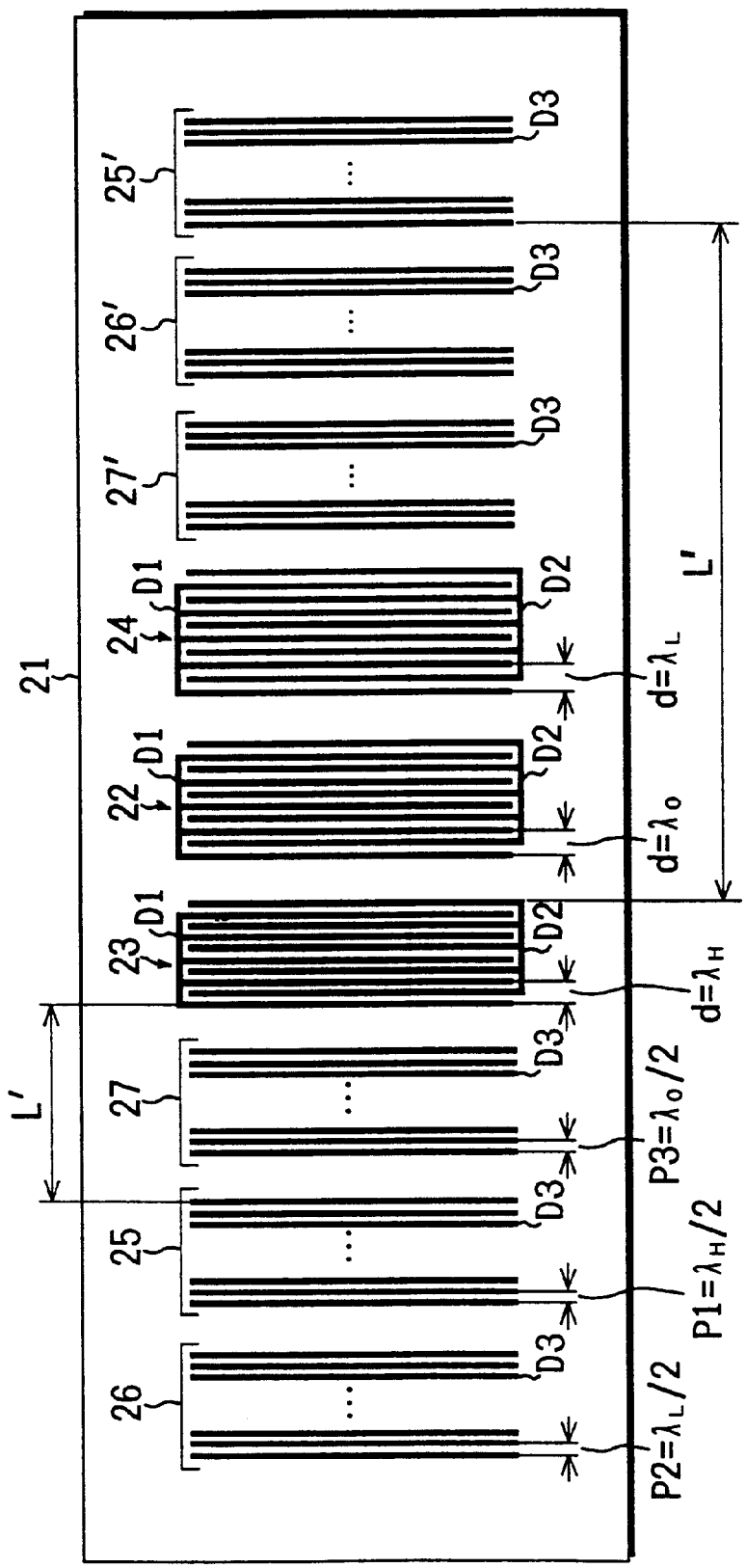
FIG. 2 is a diagram showing a construction of electrodes formed on a piezoelectric substrate.

FIG. 1 is a construction diagram of an elastic surface wave gyroscope according to a first embodiment of the invention, and FIG. 2 is a diagram showing a construction of electrodes formed on a piezoelectric substrate.

A gyroscope 1 includes a detecting device 2 for detecting a Coriolis force and high frequency oscillators 3, 4 as drive sources of elastic surface waves.

The detecting device 2 includes a rectangular piezoelectric substrate 21 on one surface of which a Coriolis force detector is formed. The Coriolis force detector is comprised of a transducer 22 for detecting a Coriolis force, a transducer 23 for generating an elastic surface wave of frequency $f_H(=f_0+\Delta f[Hz])$, a transducer 24 for generating an elastic surface wave of frequency $f_L(=f_0-\Delta f[Hz])$, pairs of reflectors 25, 25' (indicated at "A" in FIG. 1), 26, 26' (indicated at "B" in FIG. 1) and 27, 27' (indicated at "C" in FIG. 1).

The transducers 22 to 24 and the reflectors 25, 25' to 27, 27' are arranged in one line along the length of the piezoelectric substrate 21. The transducer 22 for detecting the Coriolis force is arranged substantially in the middle of the piezoelectric substrate 21, and the transducer 23 for generating the elastic surface wave of frequency $f_H$ (hereinafter, "first elastic surface wave") and the transducer 24 for generating the elastic surface wave of frequency $f_L$ (hereinafter, "second elastic surface wave") are arranged on the left and right sides of the transducer 23. Further, the reflectors 27', 26', 25' are arranged in this order toward the outer side on the outside of the transducer 24. Similarly, the reflectors 27, 25, 26 are arranged in this order toward the outer side on the outside of the transducer 23.

The high frequency oscillator 3 is an oscillator for generating a high frequency wave of $f_H$, whereas the high frequency oscillator 4 is an oscillator for generating a high frequency wave of $f_L$. The high frequency oscillators 3, 4 are each constructed by an elastic surface wave oscillator using an elastic surface wave resonator made of the same material as the piezoelectric substrate 21 and formed on the piezoelectric substrate 21. Output terminals b, b' of the high frequency oscillator 3 are connected with the transducer 23, and output terminals c, c' of the high frequency oscillator 4 are connected with the transducer 24.

Figure 3:
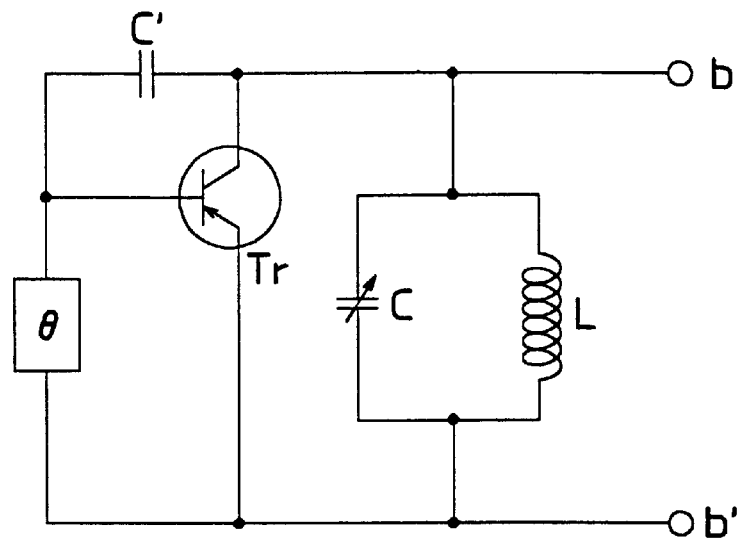
FIG. 3 is a diagram showing one exemplary basic circuit construction of a high frequency oscillator using an elastic surface wave resonator.
Figure 4:
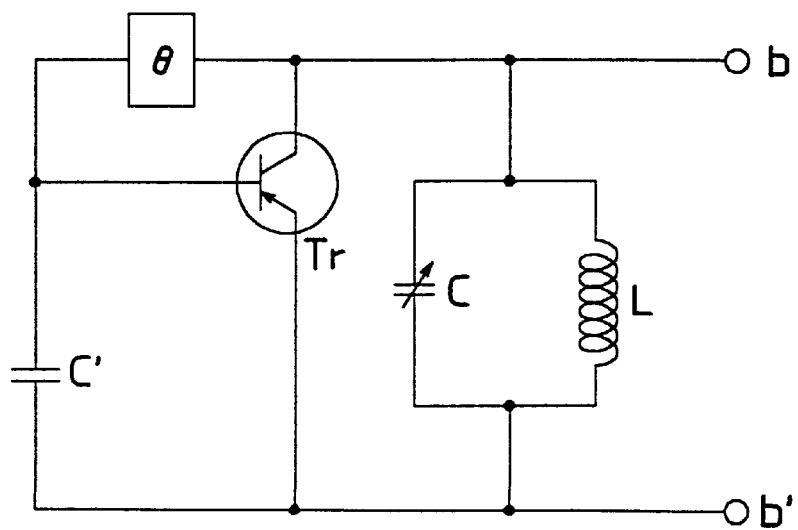
FIG. 4 is a diagram showing another exemplary basic circuit construction of a high frequency oscillator using an elastic surface wave resonator.
Figure 5:
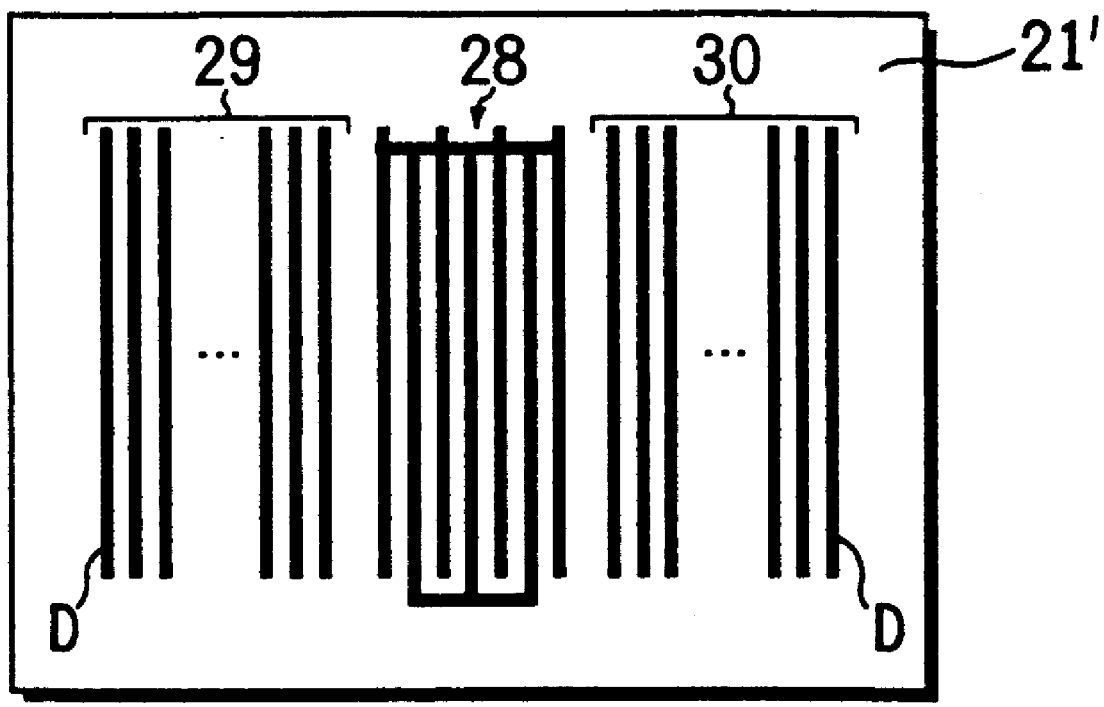
FIG. 5 is a plan view showing a construction of an elastic surface wave resonator.

The high frequency oscillators 3, 4 can be each realized by constructing a resonance device θ, for example, in a B-E Pierce oscillator circuit shown in FIG. 3 or in a C-B Pierce oscillator circuit shown in FIG. 4 by an elastic surface wave resonator shown in FIG. 5. In the elastic surface wave resonator shown in FIG. 5, grating reflectors (open grating reflectors) 29, 30 comprised of a multitude of line electrodes D are arranged on the opposite sides of an inter-digital transducer (hereinafter, "IDT") 28 on a piezoelectric substrate 21'. The resonance frequency of the elastic surface wave resonator of the high frequency oscillator 3 is set at $(f_0+\Delta f)$, and the resonance frequency of the elastic surface wave resonator of the high frequency oscillator 4 is set at $(f_0-\Delta f)$.

The high frequency oscillators 3, 4 may be a crystal oscillator or other oscillator having a high Q. However, in the case that the stabilization of the temperature characteristic of the gyroscope 1 is considered, they are preferably constructed by an oscillator using an elastic surface wave resonator formed of the same piezoelectric material as the piezoelectric substrate 21.

For example, in the case that $LiNbO_3$ is used as a material of the piezoelectric substrate 21 having a large electromechanical coupling coefficient $k^2$, its temperature characteristic is about 70 ppm. If the resonance band of the reflectors 25, 25' to 27, 27' is, for example, 5 MHz, the resonance characteristic of the reflectors 25, 25' to 27, 27' may lie outside a specified resonance band in a temperature range of $-20°$ C. to $50°$ C. which is a normal application condition. For example, the reflectors 25, 25' act to generate a standing wave by reflecting the first elastic surface wave. If the resonance characteristic of the reflectors 25, 25' drifts due to a temperature change and a sufficient reflection characteristic is not obtained the standing wave of the first elastic surface wave of stable level cannot be obtained. The temperature effect is the same for the reflectors 26, 26' and the reflectors 27, 27'.

Using the above-described structure, an elastic surface wave gyroscope is created, when the piezoelectric substrate undergoes a rotary motion while the surface of the piezoelectric substrate is vibrated, so that a Coriolis force generated by the interaction of the surface oscillation and the rotary motion of the piezoelectric substrate may be detected. The stability of the frequency of the surface oscillation of the piezoelectric substrate (i.e., frequency of the elastic surface wave) is important, but the amplitude of the surface oscillation of the piezoelectric substrate is more important for the stabilization of the detection sensitivity of a Coriolis force.

Accordingly, in this embodiment, the oscillating devices of high frequency oscillators 3, 4 are constructed by the elastic surface wave resonators made of the same piezoelectric material as the gyroscope 1 to stabilize the standing waves of the first and second elastic surface waves by matching the oscillation drift characteristics of the high frequency oscillators 3, 4 according to the drifts of the resonance characteristics of the reflectors 25, 25', 26, 26'.

In this embodiment, if the resonance frequency of the elastic surface wave resonator θ of the high frequency oscillator 3 has drifted from $(f_0+\Delta f)$ to $(f_0+\Delta f+\Delta f_t)$ due to a temperature change, thereby causing an oscillation frequency variation, the resonance frequency (i.e., reflection frequency) of the reflectors 25, 25' also drifts from $(f_0+\Delta f)$ to $(f_0+\Delta f+\Delta f_t)$. Accordingly, even if the frequency of the first elastic surface wave generated on the surface of the piezoelectric substrate 21 varies, the first elastic surface wave is suitably reflected by the reflectors 25, 25', with the result that the amplitude of the first elastic surface wave (standing wave) can be stabilized against a temperature change. Similarly, if the resonance frequency of the elastic surface wave resonator θ of the high frequency oscillator 4 has drifted from $(f_0-\Delta f)$ to $(f_0-\Delta f+\Delta f_t)$ due to a temperature change, causing an oscillation frequency variation, the resonance frequency of the reflectors 26, 26' also drifts from $(f_0-\Delta f)$ to $(f_0-\Delta f+\Delta f_t)$. Accordingly, even if the frequency of the second elastic surface wave generated on the surface of the piezoelectric substrate 21 varies, the second elastic surface wave is suitably reflected by the reflectors 26, 26', with the result that the amplitude of the second elastic surface wave (standing wave) can be stabilized against a temperature change.

Accordingly, although the frequency of an interference wave of the first and second elastic surface waves changes to $(f_0+\Delta f_t)$ in response to the temperature change, the variation of the amplitude thereof is reduced. Therefore, the temperature characteristic of the detection level of a Coriolis force generated by the interaction of the interference wave and the rotary motion of the piezoelectric substrate 21 can be improved.

Although the high frequency oscillators 3, 4 may be constructed separately from the detecting device 2, it is preferable to construct them on the piezoelectric substrate 21 on which the elastic surface wave resonator θ is formed. Such a construction makes the gyroscope 1 more compact.

The piezoelectric substrate 21 is made of a material having a piezoelectric effect such as lead titanate ($PbTiO_3$), lead zirconate ($PbZrO_3$), $LiNbO_3$ or $LiTaO_3$. The transducers 22 to 24 are each constructed by an inter-digital transducer (IDT) which includes thin films of comb-shaped electrodes D1, D2 whose teeth are interlaid and which are formed on the surface of the piezoelectric substrate 21.

The frequency of the elastic surface waves is determined by the intervals of the teeth of the comb-shaped electrodes D1, D2 of the transducers 23, 24. The frequency of the elastic surface waves as an oscillation source of the piezoelectric substrate 21 may suitably be selected. In view of the miniaturization of the gyroscope 1, high frequency is preferable. High frequencies of several GHz may be used in view of the fabrication technique of the comb-shaped electrodes D1, D2. However, there is a certain limit to the selection of the high frequency due to a production cost and other factors. Normally, frequencies of 10 to 100 MHz are used.

Figure 6:
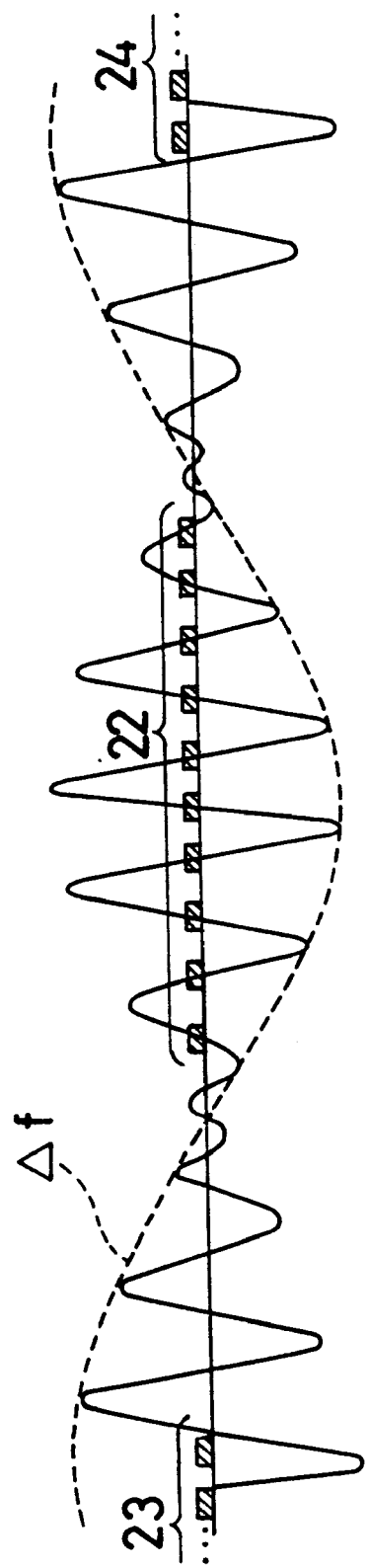
FIG. 6 is a diagram showing a mutual positional relationship of a pair of driving IDTs with respect to an elastic surface wave.

In the transducer 23 for the generation of the first elastic surface wave (hereinafter, "driving IDT 23"), an interval d between adjacent interlaid teeth of the comb-shaped electrodes D1, D2 is set at a wavelength $\lambda_H(=v_0/f_H$ where $v_0$ denotes a propagation velocity at a free surface) of the first elastic surface waves. In the transducer 24 for the generation of the second elastic surface wave (hereinafter, "driving IDT 24"), the interval d is set at a wavelength $\lambda_L(=v_0/f_L)$ of the second elastic surface wave. The driving IDTs 23, 24 are formed in such positions that N (N: natural number) waves of frequency $\Delta f$ are generated therebetween as shown in FIG. 6.

In the transducer 22 for the detection of a Coriolis force (hereinafter, "detecting IDT 22"), the interval d is set at a wavelength $\lambda_0(=v_0/f_0)$ of an elastic surface wave of frequency $f_0$ (hereinafter, "interference wave") generated by the interference of the first and second elastic surface waves. Further, as described later, the detecting IDT 22 is disposed such that the teeth of the respective comb-shaped electrodes D1, D2 thereof are located in positions corresponding to the nodes of the standing wave of the interference wave generated by the driving IDTs 23 and 24.

The reflectors 25, 25' to 27, 27' are each constructed by an open grating reflector in which a multitude of line electrodes D3 are arranged at specified intervals.

The reflectors 25, 25' reflect the first elastic surface wave toward the driving IDT 23 to generate the standing wave of the first elastic surface wave therebetween. In the reflectors 25, 25', an inter-electrode interval P1 is set at ½ of the wavelength $\lambda_H$ of the first elastic surface wave so that a center frequency becomes equal to the frequency $f_H(=f_0+\Delta f)$ of the first elastic surface wave. Further, the number of line electrodes D3 (100 line electrodes in this embodiment) is set such that a bandwidth is 2 $\Delta f$ or shorter. Since the reflection band of the reflectors 25 is $f_H\pm\Delta f(f_0$ to $f_0+2$ $\Delta f)$, the second elastic surface wave (frequency $f_L=f_0-\Delta f$) from the driving IDT 24 propagates to the reflector 26 without being reflected by the reflector 25.

The reflectors 25, 25' are so formed as to have a specified positional relationship with respect to the driving IDT 23 so as to efficiently reflect the first elastic surface wave.

Figure 7:
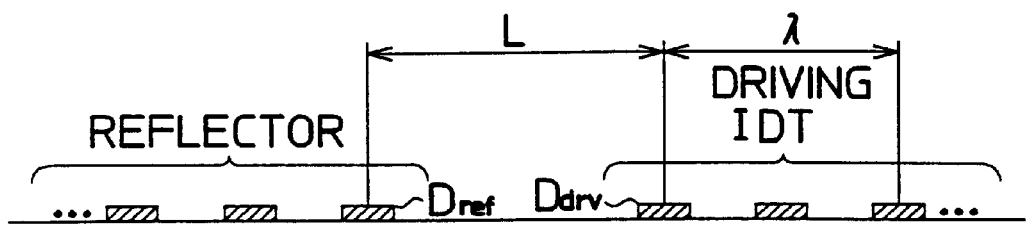
FIG. 7 is a diagram showing definition of a spacing between the driving IDT and a reflector.

Let it be assumed that a spacing between the reflector and the driving IDT is a distance L between the center of a line electrode $D_{ref}$ of the reflector located closest to the driving IDT and the center of a tooth $D_{drv}$ of the comb-shaped electrode of the driving IDT located closest to the reflector as shown in FIG. 7. Generally, in the case of an open reflector, the reflector is formed in such a position that this spacing L satisfies an equation $L=(k+¼)\cdot\lambda/2$ (where k=1, 2, 3, . . . ). This equation applies when the propagation medium of the elastic surface waves is uniform. In the case that there is a portion along a propagation path of the elastic surface wave where the propagation medium differs, a wavelength (or propagation velocity) varies in this portion. Accordingly, the distance of this portion needs to be corrected.

In this embodiment, for example, since the reflector 27 is formed between the driving IDT 23 and the reflector 23, a distance of a section of the reflector 27 needs to be corrected. The reflector 25 is so positioned with respect to the driving IDT 23 as to satisfy a conditional expression of a distance L' described below.

Figure 8:
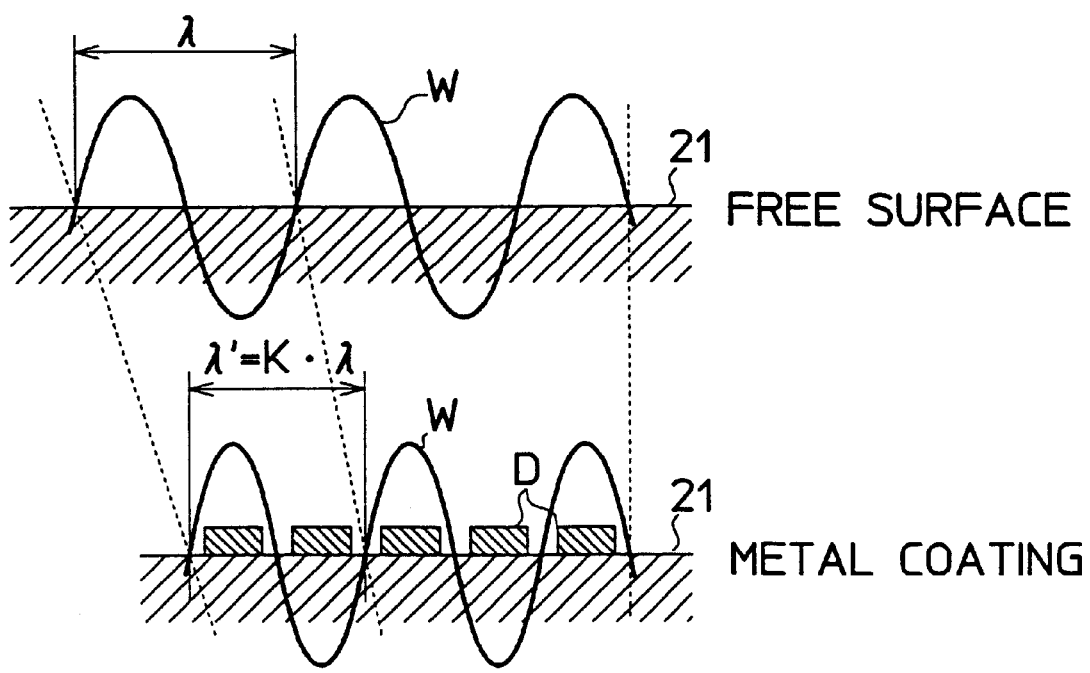
FIG. 8 is a diagram showing shortening of the wavelength of an elastic surface wave on a metal coating surface.
Figure 9:
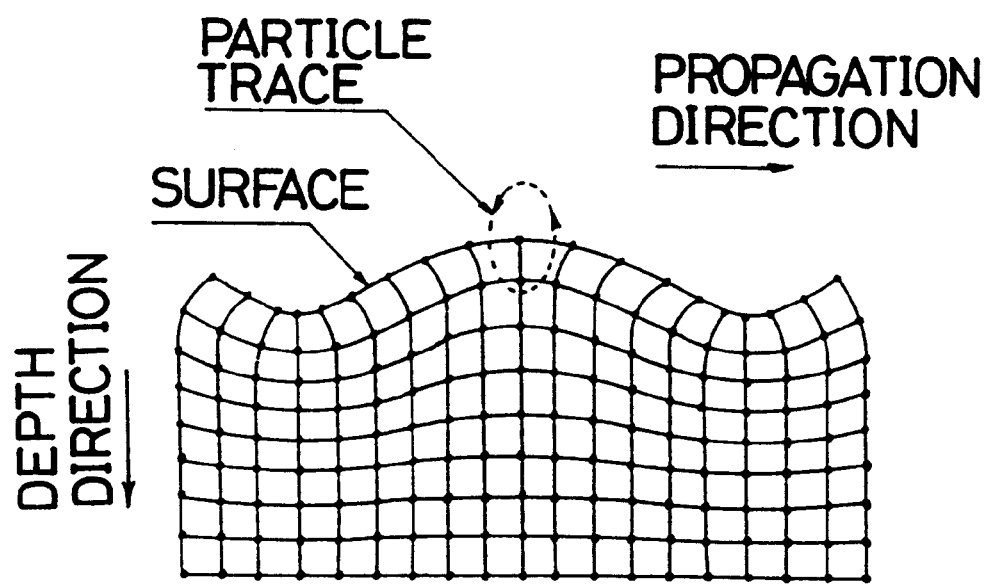
FIG. 9 is a diagram showing displacement of particles on the surface of the substrate when a Rayleigh wave propagates.

A conditional expression of the distance L is determined based on the wavelength $\lambda$ of the elastic surface wave at a free surface where no metal coating is formed. As shown in FIG. 8, an elastic surface wave W propagates more slowly where metal coatings D such as reflectors are formed on the surface of the substrate 21 than at a free surface. A wavelength $\lambda'$ in the portions where the metal coatings are formed is seemingly shorter than the wavelength $\lambda$ at the free surface.

If K is assumed to denote a wavelength shortening ratio, a distance $q\cdot\lambda$ of q waves at the free surface is shortened to $K\cdot q\cdot\lambda$ at the surface where the metal coatings are formed. A conditional expression of a distance L1 when the reflector 27 is assumed not to be formed between the reflector 25 and the driving IDT 23 is: $L1=(k+¼)\cdot\lambda_H/2$ (where K=1, 2, 3, . . . , $\lambda_H=v_0/f_H$). If, in the distance L1, r waves correspond to the reflector 27, a distance L2 of the section of the reflector 27 is $K\cdot r\cdot\lambda_0$. As compared to the case of the free surface, the distance L2 is shorter by $(1-K)\cdot r\cdot\lambda_0$.

Accordingly, the conditional expression of the distance L' which the positional relationship of the driving IDT 23 and the reflector 25 should satisfy when the reflector 27 is formed therebetween is: $L'=L1-(1-K)\cdot r\cdot\lambda_0$. If m denotes the number of the line electrodes D3 of the reflector 27 and $v_m$ denotes a propagation velocity of the elastic surface wave at the section of the reflector 27, $(1-K)\cdot r\cdot\lambda_0=(1-v_m/v_0)\cdot(m/2)\cdot(v_0/f_0)=m\cdot(v_0-v_m)/(2f_0)$ since m=2r, $K=\lambda m/\lambda_0=v_m/v_0$. The distance L' is expressed as in Equation (1):

$$L'=(k+¼)\cdot v_0/(2f_H)-m\cdot(v_0-v_m)/(2f_0) \quad (1)$$

For example, in the case that LiNbO$_3$ 128° X-Y is used as a piezoelectric material, the velocity $v_0$ of the elastic surface wave at the free surface is 3960 m/s and the velocity $v_m$ of the elastic surface wave where the metal coatings are formed is about 3920 m/s. Accordingly, if $f_0$= 60 MHz, $\Delta f$=5 MHz, k=113 and m=100, the distance L' between the driving IDT 23 and the reflector 25 is 3424.05 $\mu$m (=113.5×3960/130−100×40/120).

Similar to the reflector 25, the reflector 25' is formed in a specified position with the driving IDT 23 so as to satisfy a conditional expression of a distance L" between the driving IDT 23 and the reflector 25' in consideration of the wavelength shortening caused by the detecting IDT 22, the driving IDT 24 and the reflectors 27', 26'.

The reflectors 26, 26' are adapted to reflect the second elastic surface wave toward the driving IDT 24 to generate the standing wave of the second elastic surface wave therebetween. In the reflectors 26, 26', an inter-electrode interval P2 is set at ½ of the wavelength $\lambda_L$ of the second elastic surface wave so that the center frequency thereof becomes equal to the frequency $f_L(=f_0-\Delta f)$ of the elastic surface wave, and the number of the line electrodes D3 (100 line electrodes in this embodiment) is set so that the band width thereof is 2 $\Delta f$ or shorter. Since the reflection band of the reflector 26' is $f_L\pm\Delta f(f_0-2$ $\Delta f$ to f0), the first elastic surface wave (frequency $f_H=f_0+\Delta f$) from the driving IDT 24 propagates to the reflector 25' without being reflected by the reflector 26'.

The reflector 26 is formed in a specified position with respect to the driving IDT 24 so as to satisfy a conditional expression of a specified distance between the driving IDT 24 and the reflector 26 in consideration of the wavelength shortening caused by the detecting IDT 22, the driving IDT 23 and the reflectors 27, 25. The reflector 26' is formed in a specified position with respect to the driving IDT 24 so as to satisfy a conditional expression of a specified distance between the driving IDT 24 and the reflector 26' in consideration of the wavelength shortening caused by the reflectors 27'.

The reflectors 27, 27' are adapted to reflect a third elastic surface wave toward the detecting IDT 22 to generate the standing wave of the third elastic surface wave therebetween. In the reflectors 27, 27', an inter-electrode interval P3 is set at ½ of the wavelength $\lambda_0$ of the third elastic surface wave so that the center frequency thereof becomes equal to the frequency $f_0$ of the elastic surface wave, and the number of the line electrodes D3 (100 line electrodes in this embodiment) is set so that the band width thereof is 2 Δf or shorter.

Since the reflection band of the reflectors 27, 27' is $f_0 \pm \Delta f(f_0 - \Delta f$ to $f_0 + \Delta f)$, the first elastic surface wave (frequency $f_H = f_0 + \Delta f$) from the driving IDT 23 and the second elastic surface wave (frequency $f_L = f_0 - \Delta f$) propagate respectively to the reflectors 25, 25', 26, 26' without being reflected by the reflector 27, 27'.

The reflector 27 is formed in a specified position with respect to the driving IDT 22 so as to satisfy a conditional expression of a specified distance between the driving IDT 22 and the reflector 27 in consideration of the wavelength shortening caused by the detecting IDT 23. The reflector 27' is formed in a specified position with respect to the driving IDT 22 so as to satisfy a conditional expression of a specified distance between the driving IDT 22 and the reflector 27' in consideration of the wavelength shortening caused by the driving IDT 24.

In the above construction, when high frequency waves of $f_H$, $f_L$ are applied to the driving IDTs 23, 24, respectively, the surface of the piezoelectric substrate 21 is displaced by inverse piezoelectric effect, thereby generating the first and second elastic surface waves. For example, in the case of a Rayleigh wave, this wave has displacement components in a direction normal to the surface of the substrate and in its propagation direction. The respective particles on the surface of the piezoelectric substrate 21 are displaced along an elliptical trace inversely rotating with respect to the propagation direction. The size of the elliptical trace becomes smaller along the depth direction of the piezoelectric substrate 21. The most part of energy of the Rayleigh wave is concentrated within one wavelength along the depth direction, the Rayleigh wave propagates in the form of a surface wave.

The first elastic surface wave generated by the driving IDT 23 propagates along the length of the piezoelectric substrate 21 from the opposite sides of the driving IDT 23.

In FIG. 1, the first elastic surface wave propagating to the right from the driving IDT 23 propagates on the surface of the substrate where the detecting IDT 22, the driving IDT 24 and the reflectors 27', 26', 25' are formed. Since the detecting IDT 22, the driving IDT 24 and the reflectors 27', 26' have a reflection band in a frequency band different from the frequency band of the first elastic surface wave and the reflector 25' has a reflection band in the frequency band of the first elastic surface wave, the first elastic surface wave is reflected toward the driving IDT 23 by the reflector 25' without being reflected by the IDTs 22, 23 and the reflectors 27', 26'.

Further, the first elastic surface wave propagating to the left from the driving IDT 23 propagates on the surface of the substrate where the reflectors 27, 25 are formed. Since the reflector 27 has a reflection band in a frequency band different from the frequency band of the first elastic surface wave and the reflector 25 has a reflection band in the frequency band of the first elastic surface wave, the first elastic surface wave is reflected toward the driving IDT 23 by the reflector 25 without being reflected by the reflector 27.

Figure 10:
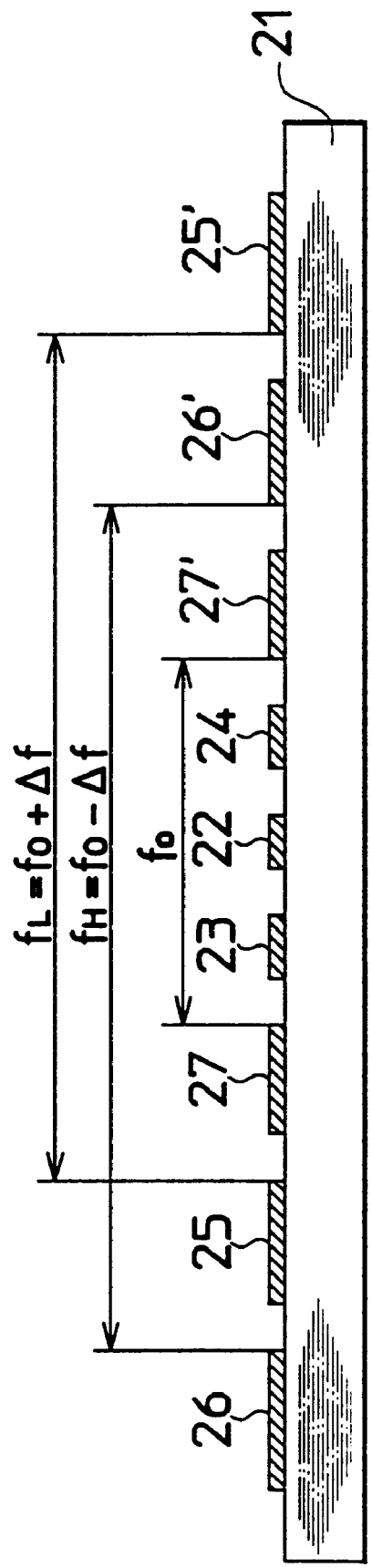
FIG. 10 is a diagram showing frequencies of standing waves generated between the respective reflectors.

Since a spacing between the reflectors 25, 25' is set at a specified value which is a multiple of the wavelength $\lambda_H$ of the first elastic surface wave, a standing wave of frequency $f_H(=f_0+\Delta f)$ is generated between the reflectors 25, 25' by the interference of the propagation wave of the first elastic surface wave from the driving IDT 23 and the reflection wave of the first elastic surface wave reflected by the reflectors 25, 25' as shown in FIG. 10.

Further, the second elastic surface wave generated by the driving IDT 24 propagates along the length of the piezoelectric substrate 21 from the opposite sides of the IDT 24.

In FIG. 1, the second elastic surface wave propagating to the right from the driving IDT 24 propagates on the surface of the substrate where the reflectors 27', 26' are formed. Since the reflectors 27' has a reflection band in a frequency band different from the frequency band of the second elastic surface wave and the reflector 26' has a reflection band in the frequency band of the second elastic surface wave, the second elastic surface wave is reflected toward the driving IDT 24 by the reflector 26' without being reflected by the reflectors 27'.

Further, the second elastic surface wave propagating to the left from the driving IDT 24 propagates on the surface of the substrate where the detecting IDT 22, the driving IDT 23 and the reflectors 27, 25, 26 are formed. Since the detecting IDT 22, the driving IDT 23 and the reflectors 27, 25 have a reflection band in a frequency band different from the frequency band of the second elastic surface wave and the reflector 26 has a reflection band in the frequency band of the second elastic surface wave, the second elastic surface wave is reflected toward the driving IDT 24 by the reflector 26 without being reflected by the IDTs 22, 23 and the reflectors 27, 25.

Since a spacing between the reflectors 26, 26' is set at a specified value which is a multiple of the wavelength $\lambda_L$ of the second elastic surface wave, a standing wave of frequency $f_L(=(f_0-\Delta f)$ is generated between the reflectors 26, 26' by the interference of the propagation wave of the second elastic surface wave from the driving IDT 24 and the reflection wave thereof reflected by the reflectors 26, 26' as shown in FIG. 10.

Further, between the reflectors 26, 26', there is generated an interference wave of $f_0(=(f_L+f_H)/2)$ by the interference of the standing wave of $f_H$ and the standing wave of $f_L$.

When the piezoelectric substrate 21 undergoes a rotary motion with the surface thereof oscillated by the interference wave, a Coriolis force acts on the interference wave. This Coriolis force $f_c$ has a dependency on a particle density ρ, an oscillating velocity V of the particles undergoing an elliptical motion, a rotational angular velocity Ω of the piezoelectric substrate 21 and is expressed by a vector Equation (2). In Equation (2), symbols in bold are vectors.

$$f_c = -2\rho \cdot V \times \Omega \qquad (2)$$

If xyz orthogonal coordinate systems in which xy plane is located on the surface of the piezoelectric substrate 21, z-axis is along a direction normal to the surface of the piezoelectric substrate 21 and x-axis is along the propagation direction of an interference wave W (see FIG. 13), the oscillating velocity V of the particles undergoing an elliptical motion in xz plane can be split into an x-axis component $V_X$ and a z-axis component $V_Z$.

Figure 11:
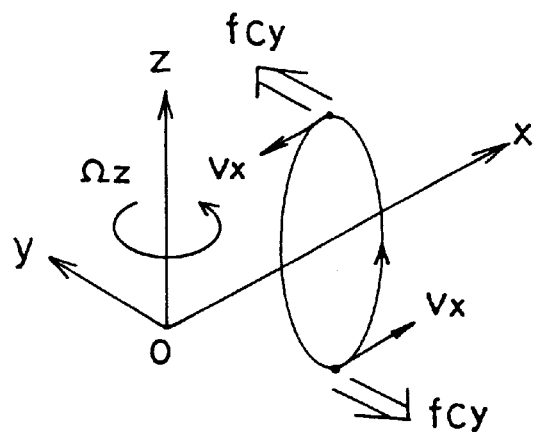
FIG. 11 is a graphical representation showing a direction of generation of a Coriolis force with respect to an elliptical motion of a particle caused by an elastic surface wave.
Figure 12:
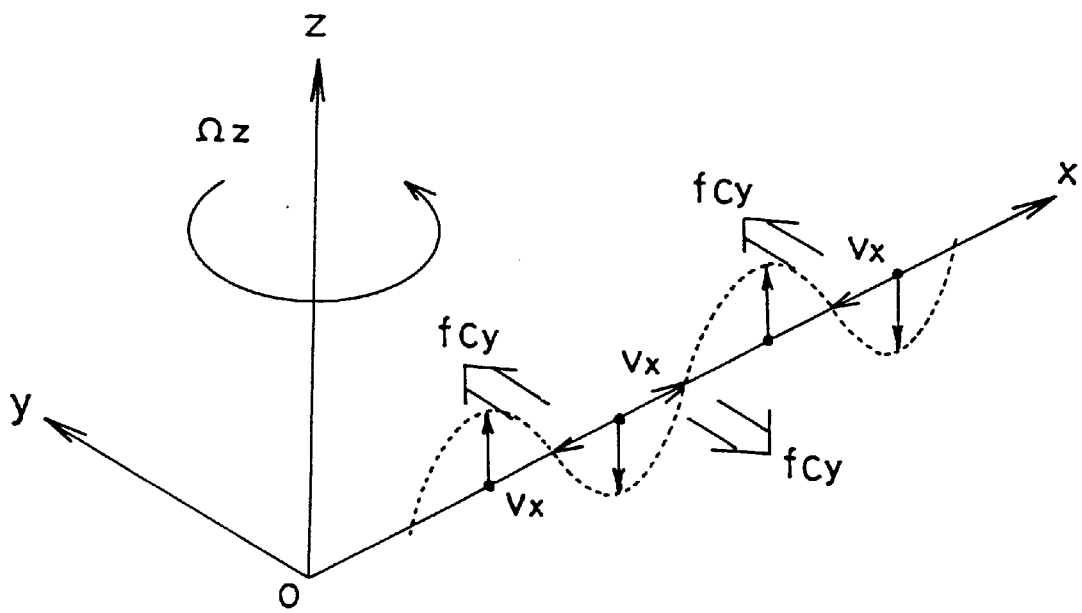
FIG. 12 is a graphical representation showing propagation of the elastic surface wave and that of an elastic surface wave caused by a Coriolis force.

If the piezoelectric substrate 21 undergoes a rotary motion at a rotational angular velocity $\Omega_Z$ about z-axis, since the direction of the oscillating velocity component $V_Z$ is parallel with the direction of axis of rotation (z-axis), a Coriolis force $f_{Cy}(=-2\rho \cdot V_X \times \Omega_z)$ parallel with xy plane and orthogonal to x-axis acts only on the particle's oscillating velocity component $V_X$ as shown in FIG. 11. This Coriolis force $f_{Cy}$ is generated with its phase shifted by 90° with respect to the interference wave W by the interaction of the elliptical motion of the particle caused by the interference wave W and the rotary motion of the piezoelectric substrate 21, and becomes an elastic surface wave which propagates in synchronism with the propagating interference wave W.

Figure 13:
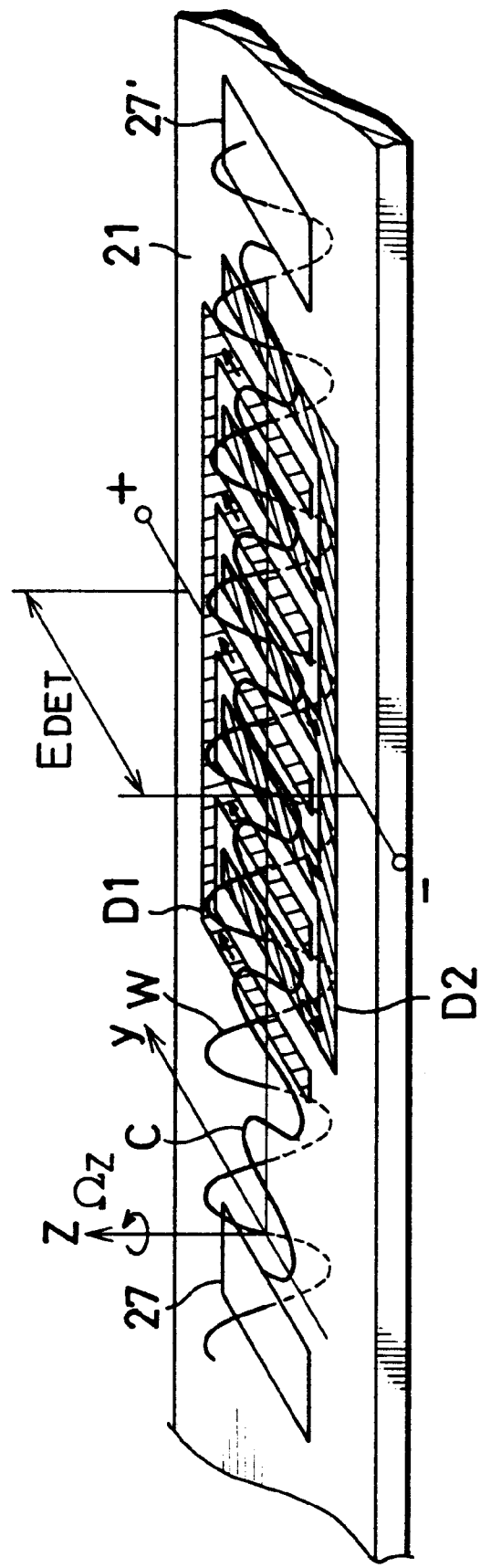
FIG. 13 is a diagram showing a relationship between an interference wave and a third elastic surface wave which is caused by a Coriolis force $f_{Cy}$ and displaced along y-axis direction.

However, a spacing between the reflectors 27, 27' is set at a specified value which is a multiple of the wavelength $\lambda_0$ of the elastic surface wave (hereinafter, "third elastic surface waves") whose phase is shifted by 90° with respect to the elastic surface wave caused by the Coriolis force $f_{Cy}$ (interference waves) at the same frequency. Accordingly, the standing wave of the third elastic surface wave caused by the Coriolis force $f_{Cy}$ is generated between the reflectors 27, 27' as shown in FIG. 13.

Coriolis forces when the piezoelectric substrate 21 undergoes a rotary motion about y-axis at a rotational angular velocity $\Omega_y$ and when the piezoelectric substrate 21 undergoes a rotary motion about x-axis at the rotational angular velocity $\Omega_x$ are as follows.

When the piezoelectric substrate 21 undergoes a rotary motion about y-axis at the rotational angular velocity $\Omega_y$, the direction of axis of rotation is orthogonal to the oscillating velocity components $V_X$, $V_Z$. Accordingly, Coriolis forces $f_{Cz}(=2\rho \cdot V_X \times \Omega_y)$ and $f_{Cx}(=-2\rho \cdot V_Z \times \Omega_y)$ act on the oscillating velocity components $V_X$, $V_Z$. When the piezoelectric substrate 21 undergoes a rotary motion about x-axis at the rotational angular velocity $\Omega_x$, the direction of axis of rotation is orthogonal to the oscillating velocity component $V_X$ (x-axis). Accordingly, a Coriolis force $f_{Cy}(=2\rho \cdot V_X \times \Omega_z)$ acts on the oscillating velocity component $V_Z$ of the particle.

Thus, if $i_x$, $i_y$, $i_z$ denote unit vectors in the respective directions of x-, y- and x-axes, the vector Equation of (2) is changed into Equation (3) by being expressed in the components of the respective directions. In Equation (3), symbols in bold are vectors.

$$f_c = -2\rho \cdot (\Omega_y \cdot V_Z \cdot i_z - \Omega_z \cdot V_Z \cdot i_z - \Omega_z \cdot V_X) \cdot i_y - \Omega_y \cdot V_Z \cdot i_z \quad (3)$$

From Equation (3), it can be seen that the Coriolis force $f_c$ is a combined force of the components of the respective X-, Y- and z-axis directions. The respective components of the Coriolis force $f_c$ can be split and detected by specifically setting a polarization direction and a relationship between the detecting IDT 23 and the elastic surface wave W.

Accordingly, in this embodiment, a description is given in the case where the piezoelectric substrate 21 undergoes a rotary motion about z-axis at the rotational angular velocity $\Omega_z$ for the sake of convenience.

FIG. 13 is a diagram showing a relationship between the interference wave W and the third elastic surface wave C caused by the Coriolis force $f_{Cy}$ and displacing along the y-axis.

The phase of the third elastic surface wave C caused by the Coriolis force $f_{Cy}$ and displacing along the y-axis is shifted by 90° with respect to that of the interference wave W displacing along the z-axis, and becomes a standing wave between the reflectors 27, 27'. Since the detecting IDT 22 is formed such that the teeth of the comb-shaped electrodes D1, D2 are located in positions corresponding to the nodes of the interference wave W (loops of the third elastic surface wave C), the comb-shaped electrodes D1, D2 are displaced in directions opposite to each other by a distortion along y-axis caused by the third elastic surface wave C (see a direction of arrow in FIG. 13) and a voltage $E_{DET}$ corresponding to a displacement of the electrodes D1, D2 is generated between the electrodes D1, D2 by the piezoelectric effect of the piezoelectric substrate 21. This voltage $E_{DET}$ is detected as a Coriolis force $f_{Cy}$.

As described above, the standing wave of the first elastic surface wave of frequency $f_H(=f_0+\Delta f)$ higher than the detecting frequency $f_0$ of the Coriolis force $f_{Cy}$ and the second elastic surface wave of frequency $f_L(=f_0-\Delta f)$ lower than the detecting frequency $f_0$ are generated on the surface of the piezoelectric substrate 21, thereby generating the interference wave W of the detecting frequency $f_0$ by the interference of the first and second elastic surface waves. Further, the reflectors 27, 27' are specially provided for the Coriolis force $f_{Cy}$ generated by the interaction of the interference wave W and the rotary motion of the piezoelectric substrate 21 to generate the standing wave of the third elastic surface wave C caused by the Coriolis force $f_{Cy}$. Accordingly, the Coriolis force $f_{Cy}$ is converted into a voltage by the piezoelectric effect without being influenced by the first and second elastic surface waves and the interference wave can be detected as precisely as possible. This approach results in an improved detection sensitivity.

In the foregoing embodiment, as shown in FIG. 1, the reflector 25' for the first elastic surface wave is most outwardly arranged on the right side of the detecting IDT 22, whereas the reflector 26 for the second elastic surface wave is most outwardly arranged on the left side of the detecting IDT 22. However, provided that the third elastic surface wave, i.e., the interference wave of the first and second elastic surface waves is generated between the driving IDTs 23 and 24, the arrangement of the reflectors 25, 25' to 27, 27' is not limited to the one shown in FIG. 1.

Figure 14:
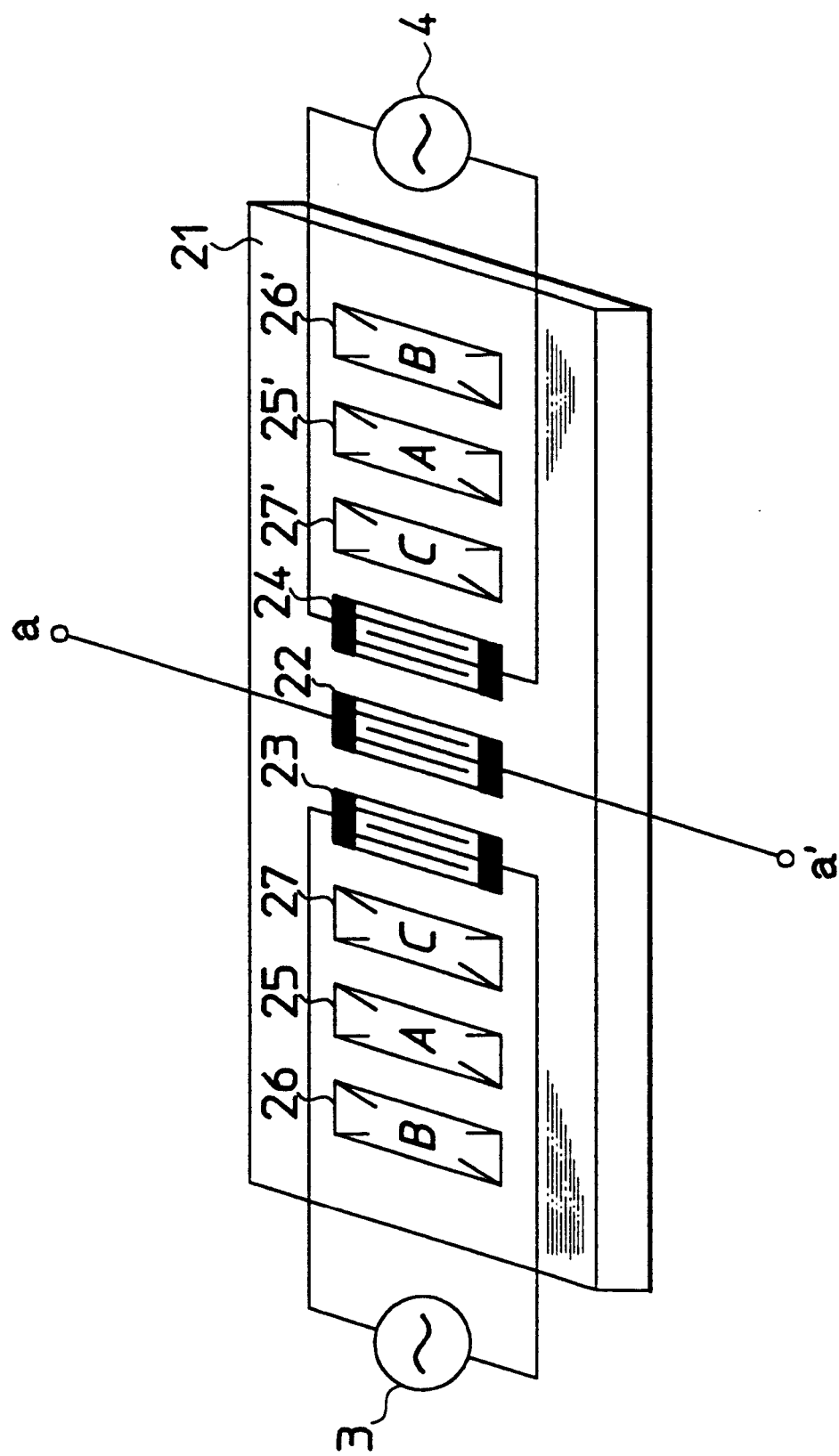
FIG. 14 is a perspective view showing a second positional arrangement of reflectors formed on the piezoelectric substrate.
Figure 15:
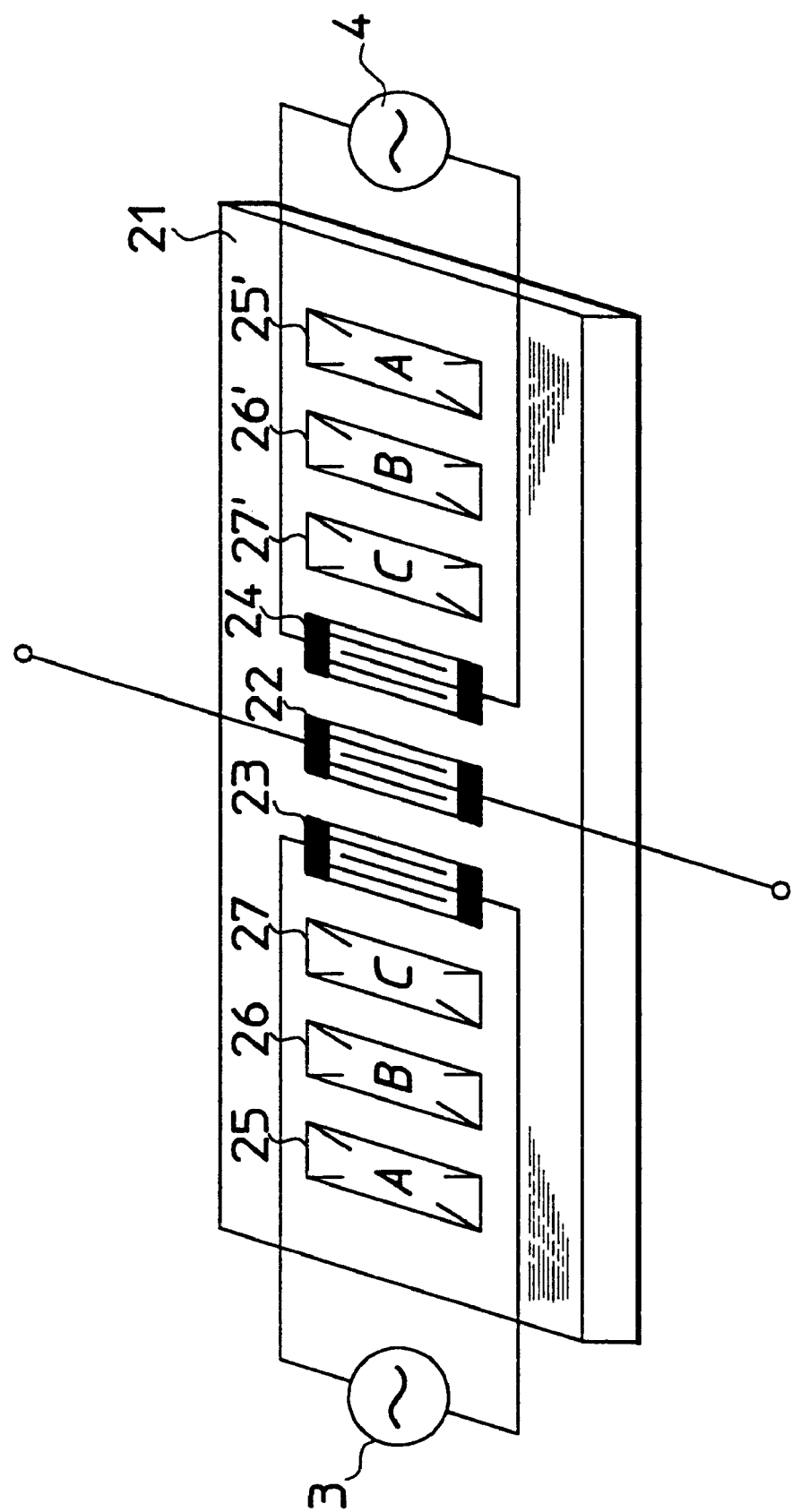
FIG. 15 is a perspective view showing a third positional arrangement of reflectors formed on the piezoelectric substrate.
Figure 16:
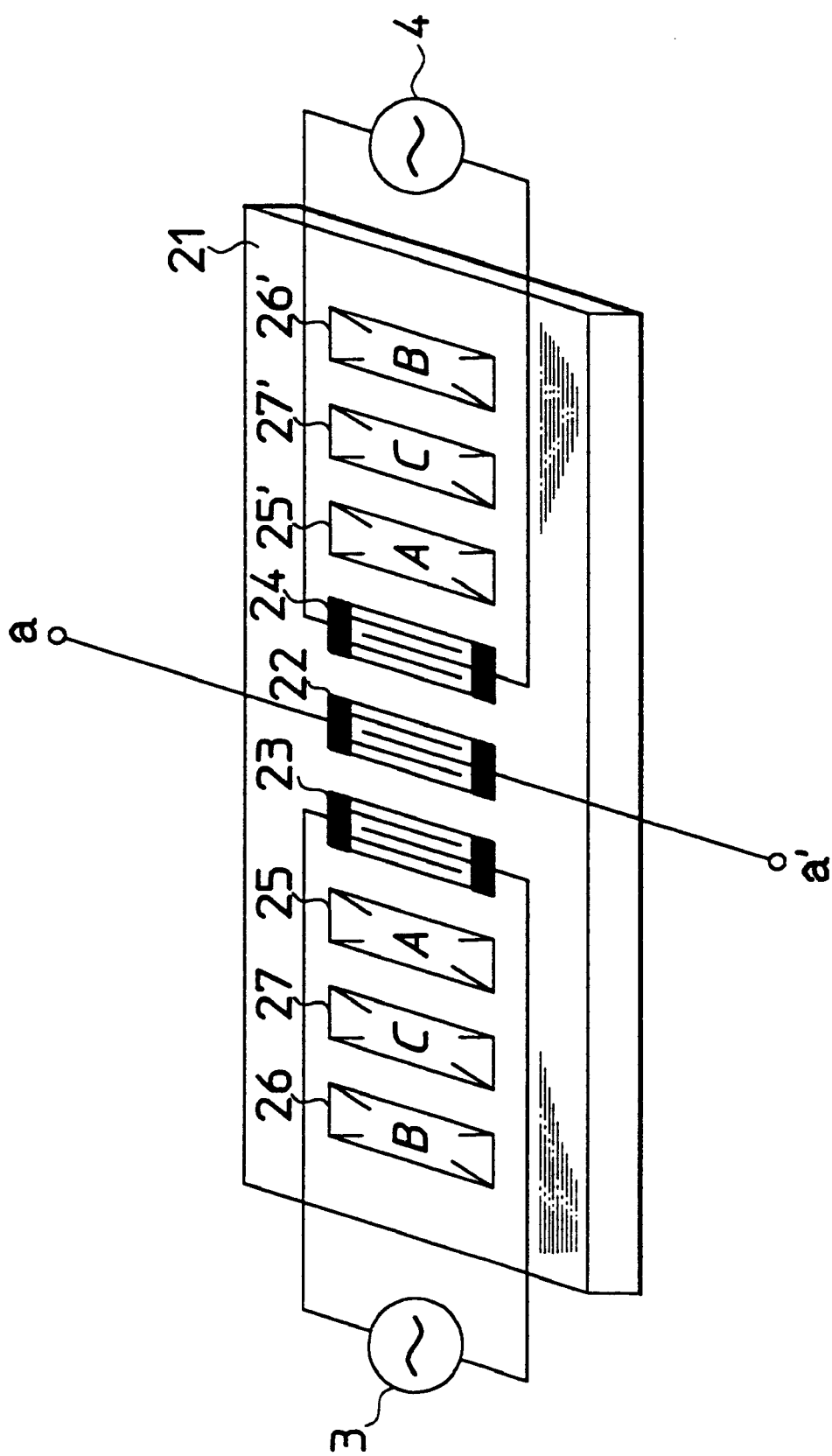
FIG. 16 is a perspective view showing a fourth positional arrangement of reflectors formed on the piezoelectric substrate.

For instance, the reflectors 25' and 26' of FIG. 1 may be switched as shown in FIG. 14 or the reflectors 25, 26 of FIG. 1 may be switched as shown in FIG. 15. Further, the reflectors 25', 27' of FIG. 14 may be switched as shown in FIG. 16. However, in consideration of the transmission loss of the third elastic surface wave caused by the Coriolis force $f_{Cy}$, it is preferable to arrange the reflectors 27, 27' most inwardly.

Figure 17:
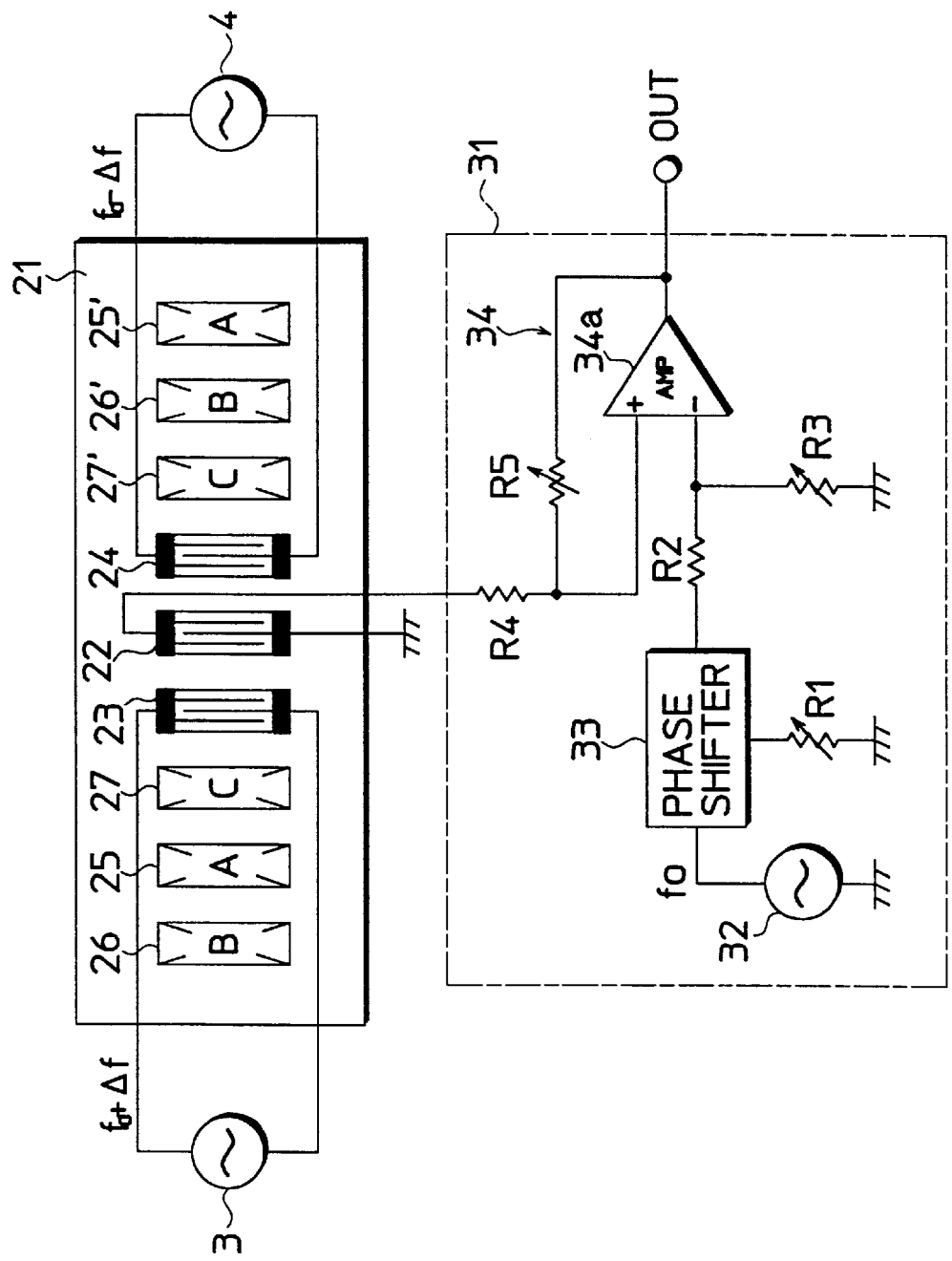
FIG. 17 is a diagram showing a second elastic surface wave gyroscope according to the invention.

FIG. 17 is a construction diagram showing a second elastic surface wave gyroscope according to the invention.

The second embodiment is designed to reduce the level of required position accuracy of the detecting IDT 22. FIG. 17 differs from FIG. 1 in that a detector circuit 31 is connected to the output terminals a, a' of the detecting IDT 22.

Since the phase of the interference wave of the first and second elastic surface waves and that of the third elastic surface wave caused by the Coriolis force are different by 90° at the same frequency, unless the detecting IDT 22 is accurately formed in a specified position with respect to the aforementioned standing wave of the third elastic surface wave, the detection signal of the detecting IDT 22 contains components of the signal obtained by voltage-converting the interference wave. The detector circuit 31 is adapted to remove the signal components corresponding to the interference waves from the detection signal of the detecting IDT 22 and to extract only signal components corresponding to the Coriolis force.

The detector circuit 31 includes a high frequency oscillator 32 for generating a high frequency wave of $f_0$, a phase shifter and a differential amplifier 34. Similar to the high frequency oscillators 3, 4, the high frequency oscillator 32 is constructed by an oscillator using an elastic surface wave resonator of resonance frequency $f_0$.

The phase shifter 33 is adapted to correct a phase shift caused by a distance difference between the detecting IDT 22 and the driving IDTs 23, 24 to render the phase of the high frequency wave outputted from the high frequency oscillator 32 in agreement with the phase of the high frequency wave of the detecting IDT 22.

The phase shifter 33 includes, for example, a phase advancing all-pass active filter, and adjusts the phase of the high frequency wave from the high frequency oscillator 32 to a desired phase by a variable resistor R1.

The differential amplifier 34 uses an operational amplifier 34a. To a (−) input terminal of the operational amplifier 34a is inputted the phase-adjusted high frequency wave via input resistors R1, R3. To a (+) input terminal of the operational amplifier 34a is inputted the detection signal of the detecting IDT 22 via a resistor R4. It should be noted that resistors R3, R5 are each constructed by a variable resistor for adjusting an input level and a gain.

The differential amplifier 34 amplifies a level difference $\Delta E = (E_{DEt} - E_r)$ between a level $E_{DET}$ of the Coriolis force detected by the detecting IDT 22 (signal converted into a high frequency wave of $f_0$ by the piezoelectric effect) and a level $E_r$ of reference high frequency waves of $f_0$ inputted from the high frequency oscillator 31 via the phase shifter 33, and outputs the amplified level difference.

In the detector circuit 31, the frequency of the high frequency oscillator 31 and the phase of the phase shifter 33 are adjusted in advance such that the output of the differential amplifier 34 is "0" under a driving condition where the piezoelectric 21 does not undergo a rotary motion.

In the above construction, when the piezoelectric substrate 21 undergoes a rotary motion, the detecting IDT 22 detects the high frequency wave of $f_0$ obtained by piezoelectrically converting the Coriolis force, and the differential amplifier 34 amplifies the level difference $\Delta E$ between the detection level $E_{DET}$ of this high frequency wave and the level $E_r$ of the reference high frequency wave of $f_0$ inputted from the high frequency oscillator 31 and outputs it.

However, the detector circuit 31 is adjusted in advance such that the output of the differential amplifier 34 is "0" in a state where no Coriolis force is generated. i.e., in a state where the detecting IDT 22 detects only signal components corresponding to the interference wave (so as to cancel the signal components corresponding to the interference wave). Accordingly, even if the detection signal of the detecting IDT 22 contains the signal components corresponding to the interference wave, the detector circuit 31 only outputs signal components corresponding to the Coriolis force. As a result, the detector circuit 31 is not influenced by the interference wave.

Accordingly, by adopting this detecting method, the Coriolis force can precisely be detected even if the position accuracy of the detecting IDT 22 is insufficient.

Figure 18:
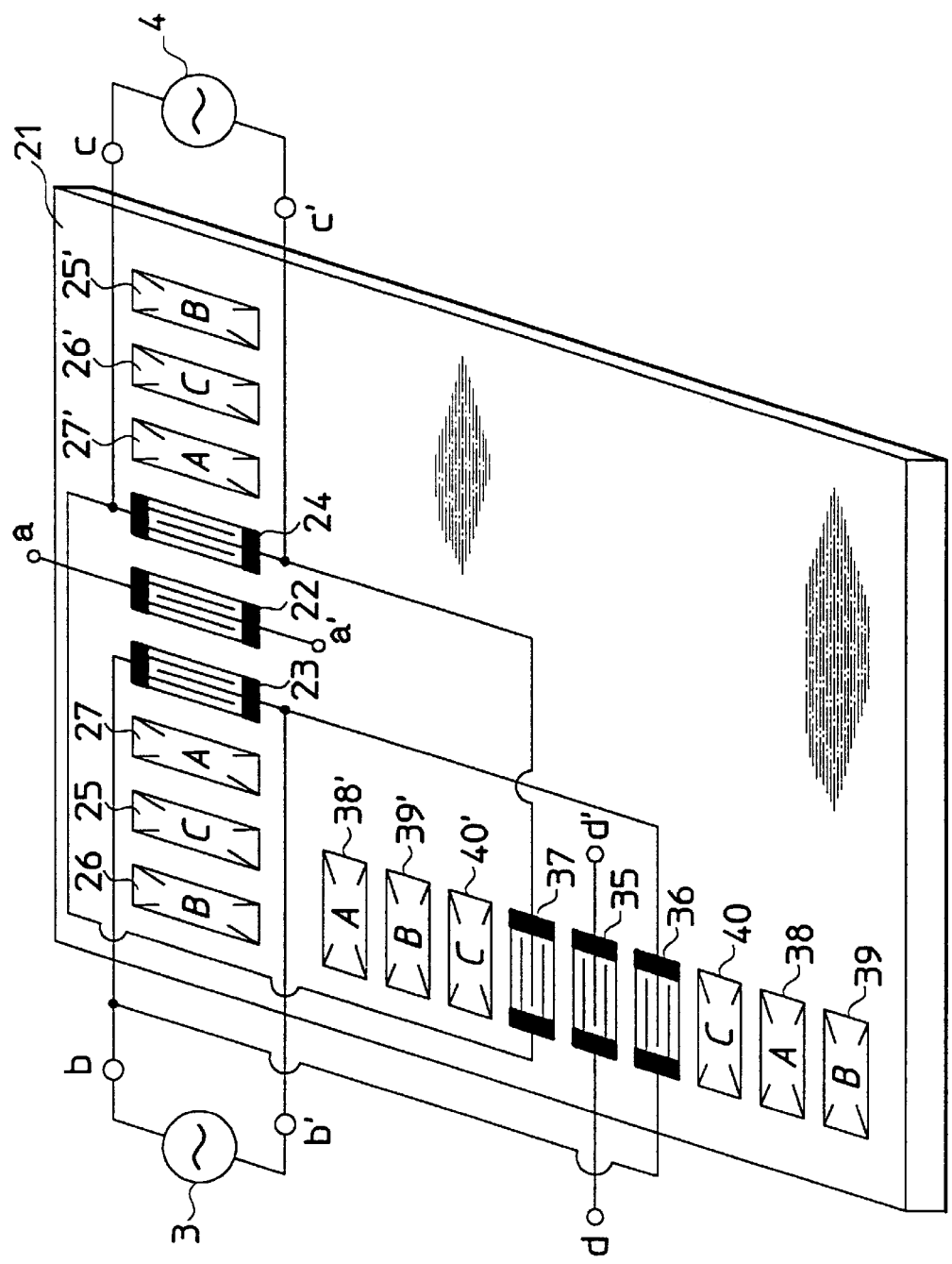
FIG. 18 is a diagram showing a third elastic surface wave gyroscope according to the invention.

FIG. 18 is a construction diagram of a third elastic surface wave gyroscope according to the invention.

The third embodiment is constructed as follows. In a direction (y-direction) normal to a direction in which the detecting IDT 22, the driving IDTs 23, 24, and the reflectors 25, 25' to 27, 27' are arranged on the surface of the piezoelectric substrate 21 in FIG. 1, there are arranged a detecting IDT 35, driving IDTs 36, 37 and reflectors 38, 38' to 40, 40' having the same construction as the detecting IDT 22, the driving IDTs 23, 24 and the reflectors 25, 25' to 27, 27'. Further, the respective output terminals b, b', c, c' of the high frequency oscillators 3, 4 are connected with the driving IDTs 36, 37, respectively.

Since the elastic surface waves which propagate along x-direction are used in the first embodiment, only the y-direction component of the Coriolis force $f_c$ can be detected. However, since the elastic surface waves which also propagate along y-direction are used in the second embodiment, the x-direction component of the Coriolis force $f_c$ can also be detected by output terminals d, d' of the detecting IDT 35. The same effect of the third embodiment can be obtained by using two gyroscopes 1 of the first embodiment which are arranged orthogonally to each other. However, since an arrangement corresponding to the two gyroscopes 1 is formed on the same piezoelectric substrate 21 according to the third embodiment, the gyroscope can be made smaller and more compact.

In the foregoing embodiments, the elastic surface wave gyroscope of the type which detects a Coriolis force generated by the interaction of the interference wave of the first and second elastic surface waves and the rotary motion of the piezoelectric substrate 21 is described. However, the invention is not limited to the above gyroscopes, but may also be applicable to an elastic surface wave gyroscope for detecting a Coriolis force generated by the interaction of standing waves generated by the reflecting the elastic surface waves generated by the piezoelectric substrate 21 by reflectors and the rotary motion of the piezoelectric substrate 21.

Figure 19:
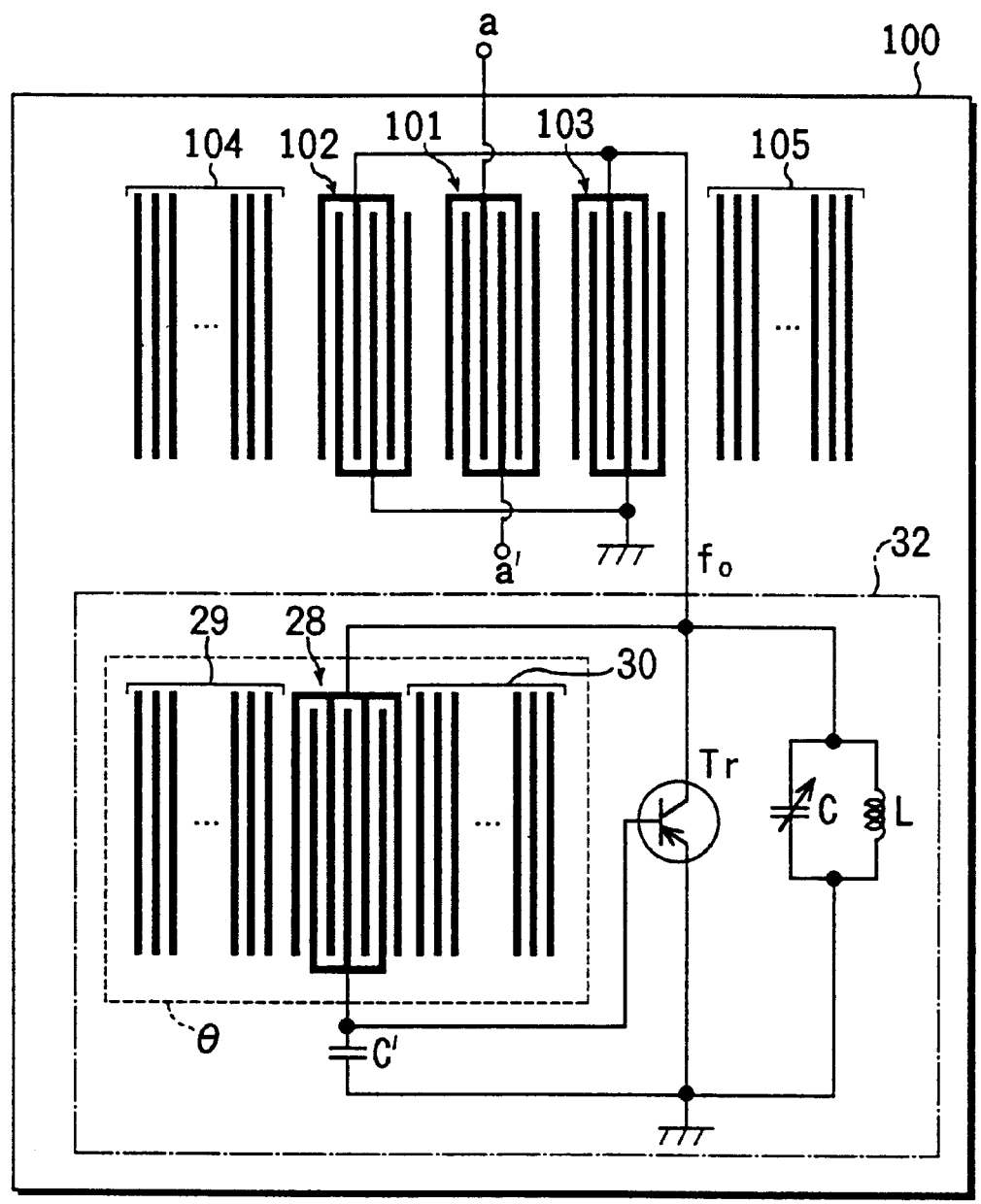
FIG. 19 is a diagram showing a fourth elastic surface wave gyroscope according to the invention.
Figure 21:
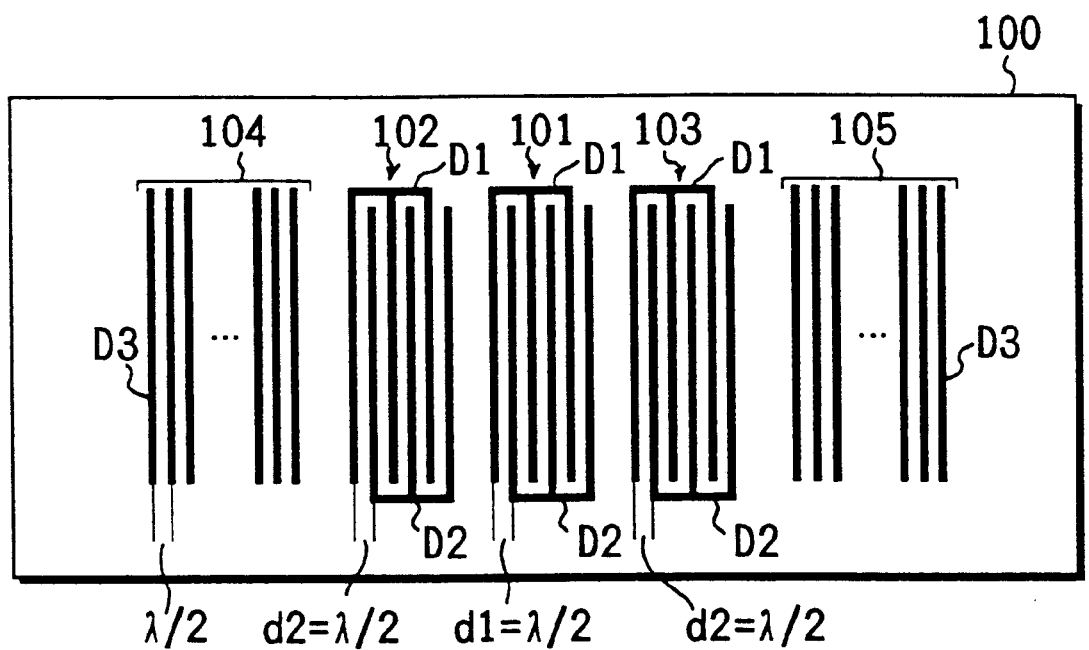
FIG. 21 is a diagram showing a detecting IDT, driving IDTs and reflectors formed on a piezoelectric substrate of a prior art elastic surface wave gyroscope.

For example, as shown in FIG. 19, the invention is also applicable to the prior art elastic surface wave gyroscope having a detecting device shown in FIG. 21. The construction of FIG. 19 differs from that of FIG. 21 in that a C-B Pierce high frequency oscillator 32 having an oscillating frequency $f_0$ which uses an elastic surface wave resonator θ (resonance frequency: $f_0$) is formed on the piezoelectric substrate 100. A biasing circuit of the high frequency oscillator 32 is omitted. The output terminals of the high frequency oscillator 32 are connected with the driving IDTs 102, 103, and high frequency wave of $f_0$ is applied to the driving IDTs 102, 103.

In the case that the oscillating frequency $f_0$ of the high frequency oscillator 32 drifts to $(f_0 + \Delta f)$ due to a temperature change, the resonance frequency $f_0$ of the reflectors 104, 105 drifts to $(f_0 + \Delta f)$. Accordingly, the amplitude characteristic of the elastic surface wave (standing wave) and the temperature characteristic of the detection sensitivity of a Coriolis force is improved.

Figure 20:
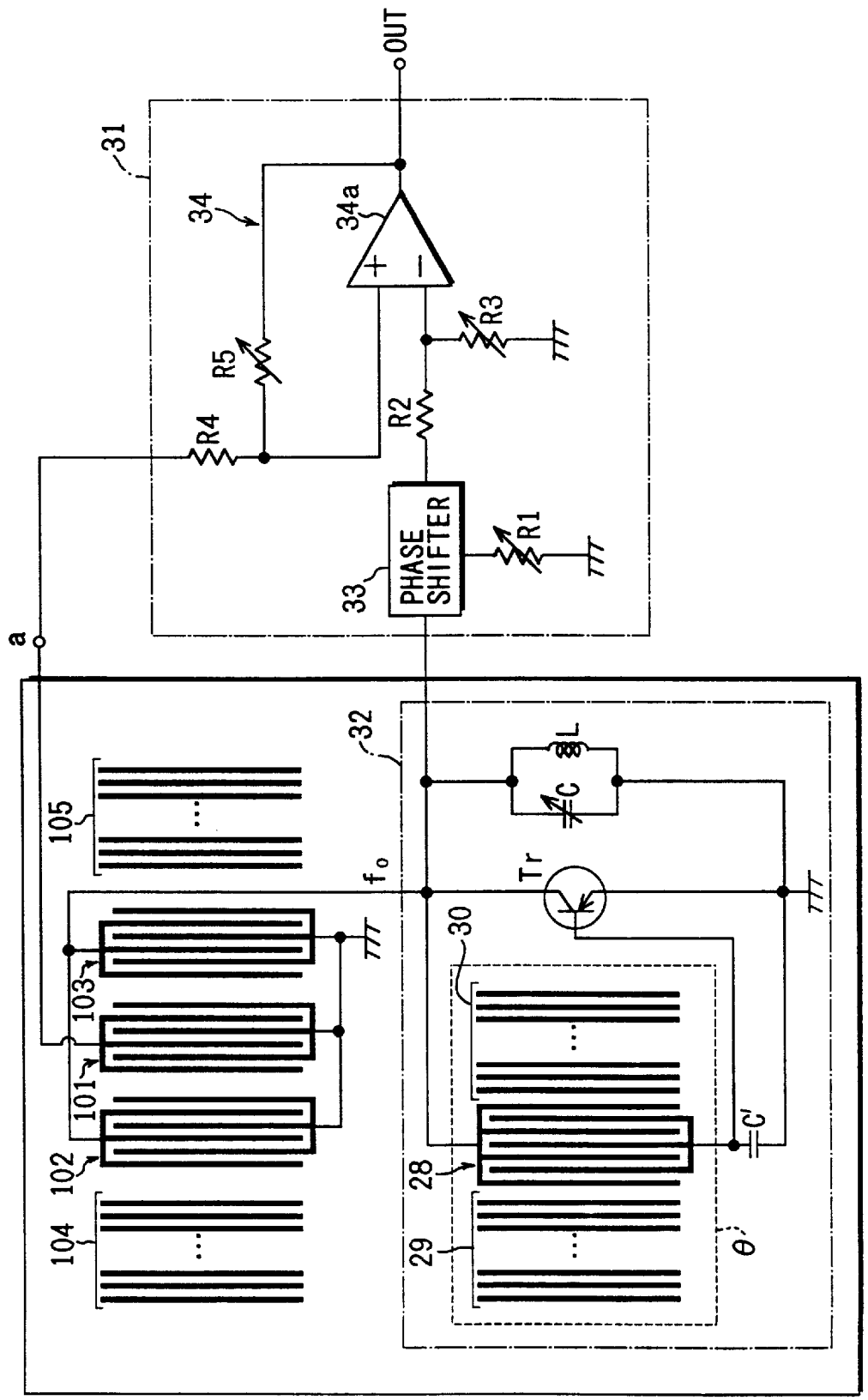
FIG. 20 is a diagram showing a fifth elastic surface wave gyroscope according to the invention.

Further, as shown in FIG. 20, if the detector circuit 31 is connected with the detecting device, the level of required position accuracy of the detecting IDT 101 with respect to the reflectors 104, 105 can be reduced. In FIG. 20, the output terminals of the high frequency oscillator 32 formed on the piezoelectric substrate 21 is connected with the driving IDTs 102, 103 as well as with the phase shifter 33 of the detector circuit 31. Since the signal components corresponding to the elastic surface wave are canceled by the differential amplifier 34 in this embodiment, only the signal components corresponding to the Coriolis force can be detected from the detection signal of the detecting IDT 101.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A gyroscope comprising:

a piezoelectric substrate;

a first generator which generates a first elastic surface wave on the piezoelectric substrate;

a second generator which generates a second elastic surface wave on the piezoelectric substrate, the second elastic surface wave having a frequency different than a frequency of the first elastic surface wave;

a first pair of reflectors which are positioned so as to reflect the first elastic surface wave toward the first generator to produce a first standing wave;

a second pair of reflectors which are positioned so as to reflect the second elastic surface wave toward the second generator to produce a second standing wave;

a third pair of reflectors which are positioned so as to reflect a third elastic surface wave toward the first and second generators to produce a third standing wave, the third elastic surface wave being an interference wave of the first and second standing waves, the third standing wave having a frequency, the third standing wave being adapted for detecting a Coriolis force; and a detector which detects an electric signal which is caused in the piezoelectric substrate by the third standing wave, said detector being positioned with respect to said first and second generators so as to detect said electric signal.

2. A gyroscope according to claim 1, wherein the first and second generators, and the detector each includes a transducer.

3. A gyroscope according to claim 2, wherein the transducer is an inter-digital transducer.

4. A gyroscope according to claim 1, wherein the first and second generators, and the first, second, and third pairs of reflectors, and the detector are arranged along a specified line.

5. A gyroscope according to claim 4, wherein the detector is arranged between the first and second generators.

6. A gyroscope according to claim 4, wherein each of said reflectors of said first pair, said second pair and said third pair of reflectors includes a plurality of line electrodes arranged at a specified interval.

7. A gyroscope according to claim 6, wherein the respective frequencies of the first, second, and third standing waves have a relationship defined by the following equation:

$$f_0 = (f_L + f_H)/2$$

wherein $f_L$ denotes the frequency of the first standing wave, $f_H$ denotes the frequency of the second standing wave, and $f_0$ denotes the frequency of the third standing wave.

8. A gyroscope according to claim 4, wherein the reflectors of the third pair of reflectors are arranged closest to the first and second generators.

9. A gyroscope according to claim 4, further comprising:

a third generator which generates a fourth elastic surface wave on the piezoelectric substrate;

a fourth generator which generates a fifth elastic surface wave on the piezoelectric substrate, the fifth elastic surface wave having a frequency different than a frequency of the fourth elastic surface wave;

a fourth pair of reflectors which reflect the fourth elastic surface wave toward the third generator to produce a fourth standing wave;

a fifth pair of reflectors which reflect the fifth elastic surface wave toward the fourth generator to produce a fifth standing wave;

a sixth pair of reflectors which reflect a sixth elastic surface wave toward the third and fourth generators to produce a sixth standing wave, the sixth elastic surface wave resulting from a Coriolis force acting on an interference wave of the fourth and fifth standing waves; and a second detector which detects an electric signal which is caused in the piezoelectric substrate by the sixth standing wave;

wherein the third and fourth generators, and the fourth, fifth, and sixth pairs of reflectors, and the second detector are arranged along a line perpendicularly intersecting the specified line.

10. A gyroscope according to claim 1, further comprising a corrector which corrects an detection of the detector to produce an electric signal having no influence of the interference wave of the first and second standing waves.

11. A gyroscope according to claim 10, wherein the corrector includes:

a signal generator which generates an electric signal corresponding to the interference wave of the first and second standing waves; and a means for detecting an electrical signal difference which is connected with the detector and the signal generator to produce an electric signal corresponding a difference between the electric signal of the detector and the electric signal of the signal generator.

12. A gyroscope according to claim 11, wherein the corrector further includes a phase shifter which adjusts a phase of the electric signal of the signal generator to substantially correspond to a phase of the electric signal of the detector.

13. A gyroscope according to claim 1, wherein the first and second generators each includes:

a transducer attached on the piezoelectric substrate; and an oscillator which generates a high frequency wave to drive the transducer, the oscillator having an elastic surface wave resonator made of the same material as the piezoelectric substrate.

14. A gyroscope according to claim 13, wherein the elastic surface wave resonator is formed on the piezoelectric substrate.

15. A gyroscope comprising:

a piezoelectric substrate;

a pair of generators which generate an elastic surface wave on the piezoelectric substrate;

a pair of reflectors which are arranged outside of the generators to reflect the elastic surface wave toward the generators to produce a standing wave;

a detector which is arranged between the pair of generators so as to detect an electric signal which is caused in the piezoelectric substrate by a wave resulting from a Coriolis force acting on the standing wave; and a corrector which corrects a detection of the detector to produce an electric signal having no influence of the standing wave.

16. A gyroscope according to claim 15, wherein the corrector includes:

a signal generator which generates an electric signal corresponding to the standing wave; and a means for detecting an electrical signal difference which is connected with the detector and the signal generator to produce an electric signal corresponding a difference between the electric signal of the detector and the electric signal of the signal generator.

17. A gyroscope according to claim 16, wherein the corrector further includes a phase shifter which adjusts a phase of the electric signal of the signal generator to substantially correspond to a phase of the electric signal of the detector.

18. A gyroscope according to claim 15, wherein each of the pair of generators includes a transducer.

19. A gyroscope according to claim 18, wherein the transducer is an inter-digital transducer.

20. A dual gyroscope comprising:

a piezoelectric substrate;

a first elastic surface wave gyroscope;

a second elastic surface wave gyroscope;

each of said first and second elastic surface wave gyroscopes being disposed on said piezoelectric substrate substantially along a line;

a line along which said first elastic surface wave gyroscope is disposed being substantially orthogonal to a line along which said second elastic surface wave gyroscope is disposed;

each of said first and second elastic surface wave gyroscopes including:

a first generator which generates a first elastic surface wave on the piezoelectric substrate;

a second generator which generates a second elastic surface wave on the piezoelectric substrate, the second elastic surface wave having a different frequency from the first elastic surface wave;

a first pair of reflectors which are positioned so as to reflect the first elastic surface wave toward the first generator to produce a first standing wave;

a second pair of reflectors which are positioned so as to reflect the second elastic surface wave toward the second generator to produce a second standing wave;

a third pair of reflectors which are positioned so as to reflect a third elastic surface wave toward the first and second generators to produce a third standing wave, the third elastic surface wave being an interference wave of the first and second standing waves, the third standing wave being adapted for detecting a Coriolis force; and a detector which detects an electric signal which is caused in the piezoelectric substrate by the third standing wave, said detector being positioned with respect to said first and second generators so as to detect said electric signal.

* * * * *

UNITED STATES PATENT AND TRADEMARK OFFICE
CERTIFICATE OF CORRECTION

PATENT NO. : 6,003,370
DATED : December 21, 1999
INVENTOR(S) : Kazuhiko YUKAWA, Yoshimitsu FUKUDA, Toshiro HIGUCHI, and Minoru KUROSAWA It is certified that error appears in the above-identified patent and that said Letters Patent is hereby corrected as shown below:

Title page, item [73] Assignee:, after "Japan", insert --, and Toshiro Higuchi, Yokohama-Shi, Japan--.

Signed and Sealed this

Twenty-third Day of January, 2001

Attest:

Q. TODD DICKINSON

*Attesting Officer*  *Commissioner of Patents and Trademarks*